(12) United States Patent
Luna et al.

(10) Patent No.: US 8,190,701 B2
(45) Date of Patent: May 29, 2012

(54) CACHE DEFEAT DETECTION AND CACHING OF CONTENT ADDRESSED BY IDENTIFIERS INTENDED TO DEFEAT CACHE

(75) Inventors: Michael Luna, San Jose, CA (US); Andrei Ponomarenko, Campbell, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

(21) Appl. No.: 13/287,072

(22) Filed: Nov. 1, 2011

(65) Prior Publication Data

US 2012/0110111 A1    May 3, 2012

Related U.S. Application Data

(60) Provisional application No. 61/408,858, filed on Nov. 1, 2010, provisional application No. 61/408,839, filed on Nov. 1, 2010, provisional application No. 61/408,829, filed on Nov. 1, 2010, provisional application No. 61/408,846, filed on Nov. 1, 2010, provisional application No. 61/408,854, filed on Nov. 1, 2010, provisional application No. 61/408,826, filed on Nov. 1, 2010, provisional application No. 61/408,820, filed on Nov. 1, 2010, provisional application No. 61/416,020, filed on Nov. 22, 2010, provisional application No. 61/416,033, filed on Nov. 22, 2010, provisional application No. 61/430,828, filed on Jan. 7, 2011, provisional application No. 61/532,857, filed on Sep. 9, 2011, provisional application No. 61/533,007, filed on Sep. 9, 2011, provisional application No. 61/533,021, filed on Sep. 9, 2011.

(51) Int. Cl.
*G06F 15/167* (2006.01)

(52) U.S. Cl. .......................... 709/213; 709/217; 709/219
(58) Field of Classification Search .................. 709/213, 709/217, 219
See application file for complete search history.

(56) References Cited

U.S. PATENT DOCUMENTS

| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |

(Continued)

FOREIGN PATENT DOCUMENTS

EP    0772327 A2    5/1997

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Mohamed Wasel
(74) *Attorney, Agent, or Firm* — Perkins Coie LLP

(57) ABSTRACT

Systems and methods for cache defeat detection are disclosed. In one aspect, embodiments of the present disclosure include a method, which may be implemented on a system, of resource management in a wireless network by caching content on a mobile device. The method can include detecting a data request to a content source for which content received is stored as cache elements in a local cache on the mobile device, determining, from an identifier of the data request, that a cache defeating mechanism is used by the content source, and/or retrieving content from the cache elements in the local cache to respond to the data request.

34 Claims, 17 Drawing Sheets

U.S. PATENT DOCUMENTS

| | | |
|---|---|---|
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,159,624 A | 10/1992 | Makita |
| 5,220,657 A | 6/1993 | Bly et al. |
| 5,263,157 A | 11/1993 | Janis |
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostreski et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |

| | | | |
|---|---|---|---|
| 6,016,520 A | 1/2000 | Facq et al. | |
| 6,018,762 A | 1/2000 | Brunson et al. | |
| 6,023,700 A | 2/2000 | Owens et al. | |
| 6,023,708 A | 2/2000 | Mendez et al. | |
| 6,029,238 A | 2/2000 | Furukawa | |
| 6,034,621 A | 3/2000 | Kaufman | |
| 6,035,104 A | 3/2000 | Zahariev | |
| 6,044,372 A | 3/2000 | Rothfus et al. | |
| 6,044,381 A | 3/2000 | Boothby et al. | |
| 6,047,051 A | 4/2000 | Ginzboorg et al. | |
| 6,047,327 A | 4/2000 | Tso et al. | |
| 6,052,563 A | 4/2000 | Macko | |
| 6,052,735 A | 4/2000 | Ulrich et al. | |
| 6,057,855 A | 5/2000 | Barkans | |
| 6,065,055 A | 5/2000 | Hughes et al. | |
| 6,073,138 A | 6/2000 | de l'Etraz et al. | |
| 6,073,142 A | 6/2000 | Geiger et al. | |
| 6,073,165 A | 6/2000 | Narasimhan et al. | |
| 6,085,166 A | 7/2000 | Beckhardt et al. | |
| 6,085,192 A | 7/2000 | Mendez et al. | |
| 6,088,677 A | 7/2000 | Spurgeon | |
| 6,101,320 A | 8/2000 | Schuetze et al. | |
| 6,101,480 A | 8/2000 | Conmy et al. | |
| 6,101,531 A | 8/2000 | Eggleston et al. | |
| 6,112,181 A | 8/2000 | Shear et al. | |
| 6,119,014 A | 9/2000 | Alperovich et al. | |
| 6,119,171 A | 9/2000 | Alkhatib | |
| 6,125,369 A | 9/2000 | Wu et al. | |
| 6,125,388 A | 9/2000 | Reisman | |
| 6,128,627 A | 10/2000 | Mattis et al. | |
| 6,130,898 A | 10/2000 | Kostreski et al. | |
| 6,131,096 A | 10/2000 | Ng et al. | |
| 6,131,116 A | 10/2000 | Riggins et al. | |
| 6,134,432 A | 10/2000 | Holmes et al. | |
| 6,138,013 A | 10/2000 | Blanchard et al. | |
| 6,138,124 A | 10/2000 | Beckhardt | |
| 6,138,128 A | 10/2000 | Perkowitz et al. | |
| 6,138,146 A | 10/2000 | Moon et al. | |
| 6,141,664 A | 10/2000 | Boothby | |
| 6,151,606 A | 11/2000 | Mendez | |
| 6,157,630 A | 12/2000 | Adler et al. | |
| 6,161,140 A | 12/2000 | Moriya | |
| 6,167,379 A | 12/2000 | Dean et al. | |
| 6,167,435 A | 12/2000 | Druckenmiller et al. | |
| 6,170,014 B1 | 1/2001 | Darago et al. | |
| 6,173,312 B1 | 1/2001 | Atarashi et al. | |
| 6,173,446 B1 | 1/2001 | Khan et al. | |
| 6,175,831 B1 | 1/2001 | Weinreich et al. | |
| 6,178,419 B1 | 1/2001 | Legh-Smith et al. | |
| 6,181,935 B1 | 1/2001 | Gossman et al. | |
| 6,195,533 B1 | 2/2001 | Tkatch et al. | |
| 6,198,696 B1 | 3/2001 | Korpi et al. | |
| 6,198,922 B1 | 3/2001 | Baynham | |
| 6,201,469 B1 | 3/2001 | Balch et al. | |
| 6,202,085 B1 | 3/2001 | Benson et al. | |
| 6,205,448 B1 | 3/2001 | Kruglikov et al. | |
| 6,212,529 B1 | 4/2001 | Boothby et al. | |
| 6,219,694 B1 | 4/2001 | Lazaridis et al. | |
| 6,221,877 B1 | 4/2001 | Aronov et al. | |
| 6,223,187 B1 | 4/2001 | Boothby et al. | |
| 6,226,686 B1 | 5/2001 | Rothschild et al. | |
| 6,233,341 B1 | 5/2001 | Riggins | |
| 6,243,705 B1 | 6/2001 | Kucala | |
| 6,246,875 B1 | 6/2001 | Seazholtz et al. | |
| 6,247,135 B1 | 6/2001 | Feague | |
| 6,249,808 B1 | 6/2001 | Seshadri | |
| 6,256,666 B1 | 7/2001 | Singhal | |
| 6,263,201 B1 | 7/2001 | Hashimoto et al. | |
| 6,263,340 B1 | 7/2001 | Green | |
| 6,269,369 B1 | 7/2001 | Robertson | |
| 6,272,545 B1 | 8/2001 | Flanagin et al. | |
| 6,275,850 B1 | 8/2001 | Beyda et al. | |
| 6,275,858 B1 | 8/2001 | Bates et al. | |
| 6,289,212 B1 | 9/2001 | Stein et al. | |
| 6,289,214 B1 | 9/2001 | Backstrom | |
| 6,292,904 B1 | 9/2001 | Broomhall et al. | |
| 6,295,541 B1 | 9/2001 | Bodnar et al. | |
| 6,300,947 B1 | 10/2001 | Kanevsky | |
| 6,304,881 B1 | 10/2001 | Halim et al. | |
| 6,308,201 B1 | 10/2001 | Pivowar et al. | |
| 6,317,594 B1 | 11/2001 | Gossman et al. | |
| 6,320,943 B1 | 11/2001 | Borland | |
| 6,324,541 B1 | 11/2001 | de l'Etraz et al. | |
| 6,324,542 B1 | 11/2001 | Wright, Jr. et al. | |
| 6,324,544 B1 | 11/2001 | Alam et al. | |
| 6,324,587 B1 | 11/2001 | Trenbeath et al. | |
| 6,327,586 B1 | 12/2001 | Kisiel | |
| 6,336,117 B1 | 1/2002 | Massarani | |
| 6,356,937 B1 | 3/2002 | Montville et al. | |
| 6,363,352 B1 | 3/2002 | Dailey et al. | |
| 6,370,566 B2 | 4/2002 | Discolo et al. | |
| 6,377,810 B1 | 4/2002 | Geiger et al. | |
| 6,380,959 B1 | 4/2002 | Wang et al. | |
| 6,389,422 B1 | 5/2002 | Doi et al. | |
| 6,389,455 B1 | 5/2002 | Fuisz | |
| 6,389,457 B2 | 5/2002 | Lazaridis et al. | |
| 6,397,057 B1 | 5/2002 | Malackowski et al. | |
| 6,397,230 B1 | 5/2002 | Carmel et al. | |
| 6,401,104 B1 | 6/2002 | LaRue et al. | |
| 6,401,112 B1 | 6/2002 | Boyer et al. | |
| 6,401,113 B2 | 6/2002 | Lazaridis et al. | |
| 6,405,197 B2 | 6/2002 | Gilmour | |
| 6,411,696 B1 | 6/2002 | Iverson et al. | |
| 6,415,031 B1 | 7/2002 | Colligan et al. | |
| 6,418,308 B1 | 7/2002 | Heinonen et al. | |
| 6,421,669 B1 | 7/2002 | Gilmour et al. | |
| 6,421,781 B1 | 7/2002 | Fox et al. | |
| 6,430,602 B1 | 8/2002 | Kay et al. | |
| 6,438,585 B2 | 8/2002 | Mousseau et al. | |
| 6,438,612 B1 | 8/2002 | Ylonen et al. | |
| 6,442,589 B1 | 8/2002 | Takahashi et al. | |
| 6,442,637 B1 | 8/2002 | Hawkins et al. | |
| 6,446,118 B1 | 9/2002 | Gottlieb | |
| 6,463,463 B1 | 10/2002 | Godfrey et al. | |
| 6,463,464 B1 | 10/2002 | Lazaridis et al. | |
| 6,487,557 B1 | 11/2002 | Nagatomo | |
| 6,487,560 B1 | 11/2002 | LaRue et al. | |
| 6,490,353 B1 | 12/2002 | Tan | |
| 6,496,802 B1 | 12/2002 | van Zoest et al. | |
| 6,499,054 B1 | 12/2002 | Hesselink et al. | |
| 6,505,214 B1 | 1/2003 | Sherman et al. | |
| 6,516,327 B1 | 2/2003 | Zondervan et al. | |
| 6,526,433 B1 | 2/2003 | Chang et al. | |
| 6,526,506 B1 | 2/2003 | Lewis | |
| 6,529,908 B1 | 3/2003 | Piett et al. | |
| 6,532,446 B1 | 3/2003 | King | |
| 6,535,892 B1 | 3/2003 | LaRue et al. | |
| 6,546,005 B1 | 4/2003 | Berkley et al. | |
| 6,549,939 B1 | 4/2003 | Ford et al. | |
| 6,556,217 B1 | 4/2003 | Makipaa et al. | |
| 6,593,944 B1 | 7/2003 | Nicolas et al. | |
| 6,601,026 B2 | 7/2003 | Appelt et al. | |
| 6,615,253 B1 | 9/2003 | Bowman-Amuah | |
| 6,618,710 B1 | 9/2003 | Zondervan et al. | |
| 6,621,892 B1 | 9/2003 | Banister et al. | |
| 6,625,621 B2 | 9/2003 | Tan et al. | |
| 6,636,482 B2 | 10/2003 | Cloonan et al. | |
| 6,639,693 B1 | 10/2003 | Ejiri et al. | |
| 6,640,097 B2 | 10/2003 | Corrigan et al. | |
| 6,640,244 B1 | 10/2003 | Bowman-Amuah | |
| 6,640,249 B1 | 10/2003 | Bowman-Amuah | |
| 6,643,650 B1 | 11/2003 | Slaughter et al. | |
| 6,643,688 B1 | 11/2003 | Fuisz | |
| 6,647,384 B2 | 11/2003 | Gilmour | |
| 6,650,890 B1 | 11/2003 | Irlam et al. | |
| 6,662,016 B1 | 12/2003 | Buckham et al. | |
| 6,668,046 B1 | 12/2003 | Albal | |
| 6,671,695 B2 | 12/2003 | McFadden | |
| 6,671,700 B1 | 12/2003 | Creemer et al. | |
| 6,671,702 B2 | 12/2003 | Kruglikov et al. | |
| 6,671,757 B1 | 12/2003 | Multer et al. | |
| 6,694,336 B1 | 2/2004 | Multer et al. | |
| 6,697,807 B2 | 2/2004 | McGeachie | |
| 6,701,378 B1 | 3/2004 | Gilhuly et al. | |
| 6,707,801 B2 | 3/2004 | Hsu | |
| 6,708,221 B1 | 3/2004 | Mendez et al. | |
| 6,714,965 B2 | 3/2004 | Kakuta et al. | |
| 6,721,787 B1 | 4/2004 | Hiscock | |

| Patent Number | Date | Inventor |
|---|---|---|
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Kasriel et al. |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |

| | | |
|---|---|---|
| 7,584,294 B2 | 9/2009 | Plamondon |
| 7,587,482 B2 | 9/2009 | Henderson et al. |
| 7,587,608 B2 | 9/2009 | Haller et al. |
| 7,593,714 B2 | 9/2009 | Schultz et al. |
| 7,596,608 B2 | 9/2009 | Alexander et al. |
| 7,613,792 B2 | 11/2009 | Zervas et al. |
| 7,643,818 B2 | 1/2010 | Backholm et al. |
| 7,644,166 B2 | 1/2010 | Appelman et al. |
| 7,672,439 B2 | 3/2010 | Appelman et al. |
| 7,680,281 B2 | 3/2010 | Fiatal et al. |
| 7,689,664 B2 | 3/2010 | Karlberg |
| 7,693,944 B2 | 4/2010 | Appelman et al. |
| 7,694,008 B2 | 4/2010 | Chang et al. |
| 7,706,781 B2 | 4/2010 | Backholm et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,778,792 B2 | 8/2010 | Huang et al. |
| 7,783,757 B2 | 8/2010 | Plamondon |
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,899,996 B1 | 3/2011 | Levin-Michael |
| 7,917,505 B2 | 3/2011 | van Gent et al. |
| 7,921,167 B2 | 4/2011 | Shroff et al. |
| 7,933,929 B1 | 4/2011 | McClendon et al. |
| 7,937,091 B2 | 5/2011 | Roman et al. |
| 7,970,860 B2 | 6/2011 | Kline et al. |
| 7,996,487 B2 | 8/2011 | Snyder |
| 8,005,891 B2 | 8/2011 | Knowles et al. |
| 8,010,082 B2 | 8/2011 | Sutaria et al. |
| 8,032,409 B1 | 10/2011 | Mikurak |
| 8,064,583 B1 | 11/2011 | Sutaria et al. |
| 8,069,166 B2 | 11/2011 | Alvarado et al. |
| 8,078,158 B2 | 12/2011 | Backholm |
| 2001/0009025 A1 | 7/2001 | Ahonen |
| 2001/0010046 A1 | 7/2001 | Muyres et al. |
| 2001/0013069 A1 | 8/2001 | Shah |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0053687 A1 | 12/2001 | Sivula |
| 2002/0002478 A1 | 1/2002 | Swart et al. |
| 2002/0002591 A1 | 1/2002 | Ketola |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059457 A1 | 5/2002 | Ballard et al. |
| 2002/0068559 A1 | 6/2002 | Sharma et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0107944 A1 | 8/2002 | Bai et al. |
| 2002/0107985 A1 | 8/2002 | Hwang et al. |
| 2002/0116499 A1 | 8/2002 | Enns et al. |
| 2002/0116501 A1 | 8/2002 | Ho et al. |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 | 11/2002 | Hatanaka et al. |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0050041 A1 | 3/2003 | Wu |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227745 A1 | 12/2003 | Khoo |

| | | |
|---|---|---|
| 2003/0235308 A1 | 12/2003 | Boynton et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0120323 A1 | 6/2004 | Viikari et al. |
| 2004/0123304 A1 | 6/2004 | Black et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins |
| 2004/0179513 A1 | 9/2004 | Smith et al. |
| 2004/0181550 A1 | 9/2004 | Warsta et al. |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0230619 A1 | 11/2004 | Blanco et al. |
| 2004/0233930 A1 | 11/2004 | Colby |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0033812 A1 | 2/2005 | McCarthy et al. |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0164721 A1 | 7/2005 | Eric Yeh et al. |
| 2005/0165909 A1 | 7/2005 | Cromer et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0059495 A1 | 3/2006 | Spector |
| 2006/0063544 A1 | 3/2006 | Zhao et al. |
| 2006/0069686 A1 | 3/2006 | Beyda et al. |
| 2006/0069687 A1 | 3/2006 | Cui et al. |
| 2006/0069742 A1 | 3/2006 | Segre |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |

| | | | | | | |
|---|---|---|---|---|---|---|
| 2006/0093026 A1 | 5/2006 | Montojo et al. | 2007/0233855 A1 | 10/2007 | Brown et al. | |
| 2006/0093135 A1 | 5/2006 | Fiatal et al. | 2007/0245010 A1 | 10/2007 | Arn et al. | |
| 2006/0099969 A1 | 5/2006 | Staton et al. | 2007/0249365 A1 | 10/2007 | Jendbro | |
| 2006/0112177 A1 | 5/2006 | Barkley et al. | 2007/0250591 A1 | 10/2007 | Milic-Frayling et al. | |
| 2006/0123042 A1 | 6/2006 | Xie et al. | 2007/0264993 A1 | 11/2007 | Hughes | |
| 2006/0132495 A1 | 6/2006 | Anderson | 2007/0267492 A1 | 11/2007 | Maclaine Pont | |
| 2006/0141962 A1 | 6/2006 | Forbes et al. | 2007/0276925 A1 | 11/2007 | La Joie et al. | |
| 2006/0143464 A1 | 6/2006 | Ananthanarayanan et al. | 2007/0276926 A1 | 11/2007 | LaJoie et al. | |
| 2006/0149591 A1 | 7/2006 | Hanf et al. | 2007/0288469 A1 | 12/2007 | Shenfield | |
| 2006/0149843 A1 | 7/2006 | Rhoads et al. | 2007/0290787 A1 | 12/2007 | Fiatal et al. | |
| 2006/0149970 A1 | 7/2006 | Imazu | 2007/0293207 A1 | 12/2007 | Guedalia et al. | |
| 2006/0161621 A1 | 7/2006 | Rosenberg | 2007/0293238 A1 | 12/2007 | Fiatal et al. | |
| 2006/0165226 A1 | 7/2006 | Ernst et al. | 2007/0294295 A1 | 12/2007 | Finkelstein et al. | |
| 2006/0168043 A1 | 7/2006 | Eisenberger et al. | 2007/0294763 A1 | 12/2007 | Udezue et al. | |
| 2006/0168164 A1 | 7/2006 | Lemson et al. | 2008/0001717 A1 | 1/2008 | Fiatal | |
| 2006/0179410 A1 | 8/2006 | Deeds | 2008/0008095 A1 | 1/2008 | Gilfix | |
| 2006/0188864 A1 | 8/2006 | Shah | 2008/0009344 A1 | 1/2008 | Graham et al. | |
| 2006/0190428 A1 | 8/2006 | Jung et al. | 2008/0016236 A1 * | 1/2008 | Beverly et al. | 709/230 |
| 2006/0190984 A1 | 8/2006 | Heard et al. | 2008/0032718 A1 | 2/2008 | Suresh | |
| 2006/0192014 A1 | 8/2006 | Hamilton et al. | 2008/0037787 A1 | 2/2008 | Boynton et al. | |
| 2006/0195570 A1 | 8/2006 | Zellner et al. | 2008/0059308 A1 | 3/2008 | Gerken | |
| 2006/0209842 A1 | 9/2006 | Creamer et al. | 2008/0059398 A1 | 3/2008 | Tsutsui | |
| 2006/0212531 A1 | 9/2006 | Kikkawa et al. | 2008/0061142 A1 | 3/2008 | Howcroft et al. | |
| 2006/0224629 A1 | 10/2006 | Alexander et al. | 2008/0068519 A1 | 3/2008 | Adler et al. | |
| 2006/0230394 A1 | 10/2006 | Forth et al. | 2008/0077506 A1 | 3/2008 | Rampell et al. | |
| 2006/0240804 A1 | 10/2006 | Backholm et al. | 2008/0077571 A1 | 3/2008 | Harris et al. | |
| 2006/0240805 A1 | 10/2006 | Backholm et al. | 2008/0085724 A1 | 4/2008 | Cormier et al. | |
| 2006/0242137 A1 | 10/2006 | Shah et al. | 2008/0086379 A1 | 4/2008 | Dion et al. | |
| 2006/0242210 A1 | 10/2006 | Ring et al. | 2008/0103877 A1 | 5/2008 | Gerken | |
| 2006/0242320 A1 | 10/2006 | Nettle et al. | 2008/0114881 A1 | 5/2008 | Lee et al. | |
| 2006/0242607 A1 | 10/2006 | Hudson | 2008/0125225 A1 | 5/2008 | Lazaridis | |
| 2006/0252435 A1 | 11/2006 | Henderson et al. | 2008/0130663 A1 | 6/2008 | Fridman et al. | |
| 2006/0253456 A1 | 11/2006 | Pacholec et al. | 2008/0133326 A1 | 6/2008 | Goncalves et al. | |
| 2006/0253605 A1 | 11/2006 | Sundarrajan et al. | 2008/0133641 A1 | 6/2008 | Gent et al. | |
| 2006/0259923 A1 | 11/2006 | Chiu | 2008/0133708 A1 | 6/2008 | Alvarado et al. | |
| 2006/0265595 A1 | 11/2006 | Scottodiluzio | 2008/0134292 A1 | 6/2008 | Ariel et al. | |
| 2006/0271884 A1 | 11/2006 | Hurst | 2008/0140665 A1 | 6/2008 | Ariel et al. | |
| 2006/0277265 A1 | 12/2006 | Backholm et al. | 2008/0151817 A1 | 6/2008 | Fitchett et al. | |
| 2006/0277271 A1 | 12/2006 | Morse et al. | 2008/0154870 A1 | 6/2008 | Evermann et al. | |
| 2006/0294071 A1 | 12/2006 | Weare et al. | 2008/0155613 A1 | 6/2008 | Benya et al. | |
| 2006/0294223 A1 | 12/2006 | Glasgow et al. | 2008/0168145 A1 | 7/2008 | Wilson | |
| 2007/0005738 A1 | 1/2007 | Alexion-Tiernan et al. | 2008/0192820 A1 | 8/2008 | Brooks et al. | |
| 2007/0011367 A1 | 1/2007 | Scott et al. | 2008/0198995 A1 | 8/2008 | McGary et al. | |
| 2007/0019610 A1 | 1/2007 | Backholm et al. | 2008/0201362 A1 | 8/2008 | Multer et al. | |
| 2007/0022118 A1 | 1/2007 | Layne | 2008/0201751 A1 | 8/2008 | Ahmed et al. | |
| 2007/0027775 A1 | 2/2007 | Hwang | 2008/0207182 A1 | 8/2008 | Maharajh et al. | |
| 2007/0027832 A1 | 2/2007 | Fiatal et al. | 2008/0209491 A1 | 8/2008 | Hasek | |
| 2007/0027886 A1 | 2/2007 | Gent et al. | 2008/0214148 A1 | 9/2008 | Ramer et al. | |
| 2007/0027917 A1 | 2/2007 | Ariel et al. | 2008/0216094 A1 | 9/2008 | Anderson et al. | |
| 2007/0027920 A1 | 2/2007 | Alvarado et al. | 2008/0220797 A1 | 9/2008 | Meiby et al. | |
| 2007/0027921 A1 | 2/2007 | Alvarado et al. | 2008/0232290 A1 | 9/2008 | Elzur et al. | |
| 2007/0027930 A1 | 2/2007 | Alvarado et al. | 2008/0233983 A1 | 9/2008 | Park et al. | |
| 2007/0033531 A1 | 2/2007 | Marsh | 2008/0270379 A1 | 10/2008 | Ramakrishna | |
| 2007/0038567 A1 | 2/2007 | Allaire et al. | 2008/0273498 A1 | 11/2008 | Jalil et al. | |
| 2007/0038931 A1 | 2/2007 | Allaire et al. | 2008/0281798 A1 | 11/2008 | Chatterjee et al. | |
| 2007/0044041 A1 | 2/2007 | Beynon et al. | 2008/0298386 A1 | 12/2008 | Fiatal | |
| 2007/0049258 A1 | 3/2007 | Thibeault | 2008/0299956 A1 | 12/2008 | Bailey et al. | |
| 2007/0060196 A1 | 3/2007 | Sharma | 2008/0301231 A1 | 12/2008 | Mehta et al. | |
| 2007/0061393 A1 | 3/2007 | Moore | 2008/0301300 A1 | 12/2008 | Toub | |
| 2007/0067381 A1 | 3/2007 | Grant et al. | 2008/0313282 A1 | 12/2008 | Warila et al. | |
| 2007/0067424 A1 | 3/2007 | Raciborski et al. | 2009/0012841 A1 | 1/2009 | Saft et al. | |
| 2007/0078857 A1 | 4/2007 | Punaganti et al. | 2009/0016526 A1 | 1/2009 | Fiatal et al. | |
| 2007/0078964 A1 | 4/2007 | East et al. | 2009/0019485 A1 | 1/2009 | Ellis et al. | |
| 2007/0088852 A1 | 4/2007 | Levkovitz | 2009/0019532 A1 | 1/2009 | Jacobsen et al. | |
| 2007/0105627 A1 | 5/2007 | Campbell | 2009/0031006 A1 | 1/2009 | Johnson | |
| 2007/0116223 A1 | 5/2007 | Burke et al. | 2009/0052372 A1 | 2/2009 | Durazzo et al. | |
| 2007/0118620 A1 | 5/2007 | Cartmell et al. | 2009/0054034 A1 | 2/2009 | Backholm et al. | |
| 2007/0130108 A1 | 6/2007 | Simpson et al. | 2009/0055353 A1 | 2/2009 | Meema | |
| 2007/0130217 A1 | 6/2007 | Linyard et al. | 2009/0063647 A1 | 3/2009 | Backholm et al. | |
| 2007/0140193 A1 | 6/2007 | Dosa et al. | 2009/0075683 A1 | 3/2009 | Backholm et al. | |
| 2007/0150881 A1 | 6/2007 | Khawand et al. | 2009/0077263 A1 | 3/2009 | Koganti et al. | |
| 2007/0156824 A1 | 7/2007 | Thompson | 2009/0094317 A1 | 4/2009 | Venkitaraman | |
| 2007/0156842 A1 | 7/2007 | Vermeulen et al. | 2009/0110179 A1 | 4/2009 | Elsey et al. | |
| 2007/0162514 A1 | 7/2007 | Civetta et al. | 2009/0119266 A1 | 5/2009 | Fitzpatrick et al. | |
| 2007/0167178 A1 | 7/2007 | Al-Harbi | 2009/0125523 A1 | 5/2009 | Fitzpatrick et al. | |
| 2007/0174433 A1 | 7/2007 | Mendez et al. | 2009/0144632 A1 | 6/2009 | Mendez | |
| 2007/0175998 A1 | 8/2007 | Lev | 2009/0147008 A1 | 6/2009 | Do et al. | |
| 2007/0198698 A1 | 8/2007 | Boyd et al. | 2009/0149203 A1 | 6/2009 | Backholm et al. | |
| 2007/0220080 A1 | 9/2007 | Humphrey | 2009/0156178 A1 | 6/2009 | Elsey et al. | |

| | | | | | | |
|---|---|---|---|---|---|---|
| 2009/0157792 | A1 | 6/2009 | Fiatal | JP | 10-336372 A | 12/1998 |
| 2009/0164433 | A1 | 6/2009 | R. et al. | JP | 2001-218185 A | 8/2001 |
| 2009/0164560 | A1 | 6/2009 | Fiatal | JP | 2001-350718 A | 12/2001 |
| 2009/0172565 | A1 | 7/2009 | Jackson et al. | JP | 2001-356973 A | 12/2001 |
| 2009/0181641 | A1 | 7/2009 | Fiatal | JP | 2005-515664 A | 5/2005 |
| 2009/0182500 | A1 | 7/2009 | Dicke | JP | 4386732 | 5/2005 |
| 2009/0187939 | A1 | 7/2009 | Lajoie | JP | 2009-207177 A | 9/2009 |
| 2009/0191903 | A1 | 7/2009 | Fiatal | KR | 2001-0018568 A | 3/2001 |
| 2009/0193130 | A1 | 7/2009 | Fiatal | KR | 2007-0071858 A | 7/2007 |
| 2009/0193338 | A1 | 7/2009 | Fiatal | KR | 2009-0077515 A | 7/2009 |
| 2009/0221326 | A1 | 9/2009 | Roussel et al. | WO | WO-97/41661 A2 | 11/1997 |
| 2009/0241180 | A1 | 9/2009 | Fiatal | WO | WO-98/24257 A1 | 6/1998 |
| 2009/0248670 | A1 | 10/2009 | Fiatal | WO | WO-98/58322 A2 | 12/1998 |
| 2009/0248696 | A1 | 10/2009 | Rowles et al. | WO | WO-01/30130 A2 | 5/2001 |
| 2009/0248794 | A1 | 10/2009 | Helms et al. | WO | WO-03/007570 A1 | 1/2003 |
| 2009/0252136 | A1 | 10/2009 | Mahany et al. | WO | WO-03/058483 A1 | 7/2003 |
| 2009/0264138 | A1 | 10/2009 | Kang et al. | WO | WO-03/058879 A1 | 7/2003 |
| 2009/0282125 | A1 | 11/2009 | Jeide et al. | WO | WO-03/065701 A1 | 8/2003 |
| 2009/0287750 | A1 | 11/2009 | Banavar et al. | WO | WO-03/098890 A1 | 11/2003 |
| 2009/0299817 | A1 | 12/2009 | Fok et al. | WO | WO-2004/017591 A2 | 2/2004 |
| 2009/0307133 | A1 | 12/2009 | Holloway et al. | WO | WO-2004045171 A1 | 5/2004 |
| 2009/0318171 | A1 | 12/2009 | Backholm et al. | WO | WO-2005/015925 A2 | 2/2005 |
| 2009/0323678 | A1 | 12/2009 | Wang | WO | WO-2005/020108 A1 | 3/2005 |
| 2009/0325565 | A1 | 12/2009 | Backholm | WO | WO-2006/045005 A2 | 4/2006 |
| 2010/0042691 | A1 | 2/2010 | Maguire | WO | WO-2006/045102 A2 | 4/2006 |
| 2010/0057924 | A1 | 3/2010 | Rauber et al. | WO | WO-2006/053952 A1 | 5/2006 |
| 2010/0077035 | A1* | 3/2010 | Li et al. ............ 709/206 | WO | WO-2006/053954 A1 | 5/2006 |
| 2010/0077083 | A1 | 3/2010 | Tran et al. | WO | WO-2006/058967 A1 | 6/2006 |
| 2010/0087167 | A1 | 4/2010 | Tsurutome et al. | WO | WO-2007/015725 A2 | 2/2007 |
| 2010/0088722 | A1 | 4/2010 | Jiang | WO | WO-2007/015726 A1 | 2/2007 |
| 2010/0115050 | A1 | 5/2010 | Sultenfuss et al. | WO | WO-2007/149526 A2 | 12/2007 |
| 2010/0131593 | A1 | 5/2010 | Kihara et al. | WO | WO-2007/149540 A2 | 12/2007 |
| 2010/0131617 | A1 | 5/2010 | Osborne et al. | WO | WO-2011126889 A2 | 10/2011 |
| 2010/0146107 | A1 | 6/2010 | Fiatal | WO | WO-2012/018430 A1 | 2/2012 |
| 2010/0174735 | A1 | 7/2010 | Fiatal | WO | WO-2012/018431 A1 | 2/2012 |
| 2010/0174939 | A1 | 7/2010 | Vexler | WO | WO-2012/018477 A2 | 2/2012 |
| 2010/0279662 | A1 | 11/2010 | Kuusinen et al. | WO | WO-2012/018479 A2 | 2/2012 |
| 2010/0313018 | A1 | 12/2010 | Jorgensen | WO | WO-2012/018556 A2 | 2/2012 |
| 2010/0319054 | A1 | 12/2010 | Mehta et al. | WO | WO 2012/024030 A2 | 2/2012 |
| 2011/0040718 | A1 | 2/2011 | Tendjoukian et al. | | | |
| 2011/0065424 | A1 | 3/2011 | Estevez et al. | | | |
| 2011/0113109 | A1 | 5/2011 | LeVasseur et al. | | | |

OTHER PUBLICATIONS

Android Developers, "Date," 10 pages, Oct. 27, 2011.

Augun, Audrey, "Integrating Lotus Notes With Enterprise Data," Lotus Notes Advisory, pp. 22-25, Jul.-Aug. 1996.

Balaban, Bob, "This Is Not Your Father's Basic: LotusScript in Notes Release 4," The View, vol. 1, Issue 5, 32 pages, Nov.-Dec. 1995.

Bedell, Doug, "Meeting Your New Best Friends Six Degrees Widens Your Contacts in Exchange for Sampling Web Sites," The Dallas Morning News, 4 pages, Oct. 27, 1998.

Bergman, Lawrence D. et al., "Programming-By-Demonstration for Behavior-Based User Interface Customization," IBM Research Report, RC23116, 5 pages, Feb. 20, 2004.

B'Far, Reza et al., "Designing Effective User Interfaces for Wireless Devices," Publication Unknown, 14 pages, Published prior to Feb. 23, 2006.

Blaney, Jeff, "You Can Take It With You—An Introduction to Mobile Computing With Notes R4," The View, vol. 2, Issue 1, 14 pages, Jan.-Feb. 1996.

Braden, R., "Requirements for Internet Hosts—Application and Support," RFC 1123, 80 pages, Oct. 1989.

Brown, Kevin et al., "Mastering Lotus Notes®," Sybex Inc., 996 pages, 1995.

"Chapter: About NotesPump," Publication Unknown, 480 pages, Published prior to Jan. 8, 2003.

"Chapter 13-1—Anatomy of a Note ID," Publication Unknown, 8 pages, Published prior to Jan. 8, 2003.

Cole, Barb et al., "Lotus Airs Notes-To-Database Integration Tool," Network World, 2 pages, Oct. 2, 1995.

"CR 3483 to Release 8 TS 25.331, Rev. 2," 3GPP TSG-RAN2 Meeting #64, Prague, Czech Republic, 11 pages, Nov. 10-14, 2008.

"CR 4100 to Release 8 TS 25.331, Rev. 1," 3GPP TSG-RAN WG2 Meeting #69, San Francisco, U.S., 6 pages, Feb. 22-26, 2010.

Dahl, Andrew, "Lotus Notes® 4 Administrator's Survival Guide," Sams Publishing, 64 pages, 1996.

| | | | |
|---|---|---|---|
| 2011/0138402 | A1 | 6/2011 | Fleming |
| 2011/0165889 | A1 | 7/2011 | Fiatal et al. |
| 2011/0179138 | A1 | 7/2011 | Van Geest et al. |
| 2011/0179377 | A1 | 7/2011 | Fleming |
| 2011/0184827 | A1 | 7/2011 | Hubert |
| 2011/0190014 | A1 | 8/2011 | Fiatal |
| 2011/0191474 | A1 | 8/2011 | Fiatal |
| 2011/0201304 | A1 | 8/2011 | Sutaria et al. |
| 2011/0207436 | A1 | 8/2011 | Van Gent et al. |
| 2011/0208810 | A1* | 8/2011 | Li et al. ............ 709/203 |
| 2011/0213800 | A1 | 9/2011 | Saros et al. |
| 2011/0213898 | A1 | 9/2011 | Fiatal et al. |
| 2011/0238772 | A1 | 9/2011 | Fiatal |
| 2011/0246950 | A1 | 10/2011 | Luna et al. |
| 2011/0252088 | A1 | 10/2011 | Fiatal |
| 2011/0264622 | A1 | 10/2011 | Vargas et al. |
| 2011/0264731 | A1 | 10/2011 | Knowles et al. |
| 2011/0294463 | A1 | 12/2011 | Fiatal |
| 2011/0294464 | A1 | 12/2011 | Fiatal |
| 2011/0302154 | A1 | 12/2011 | Snyder |
| 2012/0023190 | A1 | 1/2012 | Backholm et al. |
| 2012/0023226 | A1 | 1/2012 | Petersen et al. |
| 2012/0023236 | A1 | 1/2012 | Backholm et al. |

FOREIGN PATENT DOCUMENTS

| | | |
|---|---|---|
| EP | 1278390 A1 | 1/2003 |
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1815634 A1 | 8/2007 |
| EP | 1815652 A1 | 8/2007 |
| EP | 1817883 A1 | 8/2007 |
| FI | 117152 B1 | 6/2006 |
| FI | 118288 B1 | 9/2007 |
| FI | 119581 B1 | 12/2008 |
| JP | 4154233 A | 5/1992 |

Decker, Stefan et al., "The Social Semantic Desktop," Digital Enterprise Research Institute, DERI Technical Report May 2, 2004, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.

Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet as Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.

Qualcomm, "System Parameter Recommendations to Optimize PS Data User Experience and UE Battery Life," 80-W1112-1, Revision B, 9 pages, Mar. 2007.

Ringel, Meredith et al., "iStuff: A Scalable Architecture for Lightweight, Wireless Devices for Ubicomp User Interfaces," Proceedings of UbiComp 2002, 2 pages, 2002.

Shafran, Andrew Bryce, "Easy Lotus Notes® for Windows™," Que Corporation, 199 pages, 1994.

Signorini, Eugene, "SEVEN's Service-Based Wireless Solutions Enable Enterprises to Untether E-Mail," Wireless/Mobile Enterprise & Commerce, 16 pages, Oct. 2004.

Swedeen, Bret et al., "Under the Microscope—Domino Replication," LDD Today, 8 pages, Oct. 1, 1998.

Tamura, Randall A., "Lotus® Notes™ 4 Unleashed," Sams Publishing, 928 pages, 1996.

U.S. Appl. No. 60/663,463, File History, 113 pages, Mar. 18, 2005.

Vivacqua, Adriana et al., "Profiling and Matchmaking Strategies in Support of Opportunistic Collaboration," CoopIS/DOA/ODBASE 2003, LNCS 2888, pp. 162-177, 2003.

Wainwright, Andrew, "Secrets to Running Lotus Notes: The Decisions No One Tells You How to Make," IBM Corporation, 193 pages, Oct. 1996.

Wilcox, Adam A., "PC Learning Labs Teaches Lotus Notes 3.0," Ziff-Davis Press, 381 pages, 1993.

Wong, Harry, "Casahl's Replic-Action: Delivering True Notes-DBMS Integration," The View, vol. 2, Issue 1, pp. 33-50, Jan.-Feb. 1996.

International Application No. PCT/US2011/043322, International Search Report, 9 pages, Feb. 9, 2012.

International Application No. PCT/US2011/043328, International Search Report, 12 pages, Feb. 27, 2012.

International Application No. PCT/US2011/043409, International Search Report, 11 pages, Feb. 9, 2012.

Qualcomm Incorporated, "Managing Background Data Traffic in Mobile Devices," 16 pages, Jan. 2012.

\* cited by examiner

| Mobile Application/Widget 455 | Local Proxy 465 | Host server 485 Server Cache 435 or Caching Proxy 475 | Application Server/ Content Provider 495 |
|---|---|---|---|
| Polls application server/provider 432 | Poll intercepted and proxy determines that a cache defeating mechanism is employed by the server/provider 434 | | |
| | Proxy detects that cache content is available for the polled content and decides to retrieve a response to satisfy the poll 436 | | |
| Receives a response to the poll from a cache entry 438 | | | |
| Polls application server/provider 440 | Poll intercepted and proxy determines that a cache defeating mechanism is employed by the server/provider 442 | | |
| | Proxy detects that cache content is unavailable and decides to setup the polled source for caching 444 | | |
| | Extracts a pattern of an identifier of the request and tracks polling frequency of the application and sets up a polling schedule for the host server 446 | | |
| | Poll request forwarded to the source 448 | | Receives the poll request from the application and provides a response to satisfy the current request 450 |
| Receives the response to satisfy the request from the application server/provider 452 | Cache the response and store a normalized version of the identifier in association with the received response for future identification and retrieval 454 | | |
| | Sends the cache setup to the host server, including the identifier or a normalized version of the identifier 456 | Receives the cache setup including an identification of the application server/provider to be polled and a polling schedule 458 | |
| | | Polls the Application server/provider to monitor the response to the request 460 | Receives poll from host server and sends the response 462 |
| | | Same response received, pulls the application based on the polling schedule 464 | Receives poll from host server and sends the response 466 |
| | | Detects changed or new response; notifies the local proxy 468 | |
| | | Changed or new response stored in the server cache or the caching proxy 470 | |
| | Receives notification that new or changed data is available; invalidates relevant cache entries 472 | | |
| Polls application server/content provider 474 | Determines that no valid cache entry is available and retrieves the response from the server cache 476 | Receives request for the new response and sends the response to the local proxy 478 | |
| Request satisfied from the server cache or caching proxy 480 | | | |
| Polls application server/content provider 482 | Determines that no valid cache entry is available and forwards the poll to the application server/provider 484 | | Receives poll from and sends the response 486 |
| Request satisfied from the application server/provider 488 | | | |

*FIG. 4B*

CACHE DEFEAT DETECTION AND CACHING OF CONTENT ADDRESSED BY IDENTIFIERS INTENDED TO DEFEAT CACHE

CROSS-REFERENCE TO RELATED APPLICATIONS

This application claims the benefit of U.S. Provisional Patent Application No. 61/408,858 entitled "CROSS APPLICATION TRAFFIC COORDINATION", which was filed on Nov. 1, 2010, U.S. Provisional Patent Application No. 61/408,839 entitled "ACTIVITY SESSION AS METHOD OF OPTIMIZING NETWORK RESOURCE USE", which was filed on Nov. 1, 2010, U.S. Provisional Patent Application No. 61/408,829 entitled "DISTRIBUTED POLICY MANAGEMENT", which was filed on Nov. 1, 2010, U.S. Provisional Patent Application No. 61/408,846 entitled "INTELLIGENT CACHE MANAGEMENT IN CONGESTED WIRELESS NETWORKS", which was filed on Nov. 1, 2010, U.S. Provisional Patent Application No. 61/408,854 entitled "INTELLIGENT MANAGEMENT OF NON-CACHEABLE CONTENT IN WIRELESS NETWORKS", which was filed on Nov. 1, 2010, U.S. Provisional Patent Application No. 61/408,826 entitled "ONE WAY INTELLIGENT HEARTBEAT", which was filed on Nov. 1, 2010, U.S. Provisional Patent Application No. 61/408,820 entitled "TRAFFIC CATEGORIZATION AND POLICY DRIVING RADIO STATE", which was filed on Nov. 1, 2010, U.S. Provisional Patent Application No. 61/416,020 entitled "ALIGNING BURSTS FROM SERVER TO CLIENT", which was filed on Nov. 22, 2010, U.S. Provisional Patent Application No. 61/416,033 entitled "POLLING INTERVAL FUNCTIONS", which was filed on Nov. 22, 2010, U.S. Provisional Patent Application No. 61/430,828 entitled "DOMAIN NAME SYSTEM WITH NETWORK TRAFFIC HARMONIZATION", which was filed on Jan. 7, 2011, U.S. Provisional Patent Application No. 61/532,857 entitled "CACHE DEFEAT DETECTION AND CACHING OF CONTENT ADDRESSED BY IDENTIFIERS INTENDED TO DEFEAT CACHE", which was filed on Sep. 9, 2011, U.S. Provisional Patent Application No. 61/533,007 entitled "DISTRIBUTED CACHING INA WIRELESS NETWORK OF CONTENT DELIVERED FOR A MOBILE APPLICATION OVER A LONG-HELD REQUEST", which was filed on Sep. 9, 2011, and U.S. Provisional Patent Application No. 61/533,021 entitled "APPLICATION AND NETWORK-BASED LONG POLL REQUEST DETECTION AND CACHEABILITY ASSESSMENT THEREFOR", which was filed on Sep. 9, 2011, the contents of which are all incorporated by reference herein.

This application is further related to U.S. patent application Ser. No. 13/176,537 entitled "DISTRIBUTED CACHING AND RESOURCE AND MOBILE NETWORK TRAFFIC MANAGEMENT," which was filed on Jul. 5, 2011, the contents of which are herein incorporated by reference.

This application is related to U.S. patent application Ser. No. 13/274,250 entitled "Distributed Caching In A Wireless Network Of Content Delivered For A Mobile Application Over A Long-Held Request", which was on filed Oct. 14, 2011, the contents of which are herein incorporated by reference.

This application is further related to U.S. patent application Ser. No. 13/274,248 entitled "Application and Network-Based Long Poll Request Detection and Cacheability Assessment Therefor", which was filed on Oct. 14, 2011, the contents of which are herein incorporated by reference.

This application is related to U.S. patent application Ser. No. 13/274,265 entitled "Caching Adapted for Mobile Application Behavior and Network Conditions," which was filed on Oct. 14, 2011, the contents of which are herein incorporated by reference.

This application is related to U.S. patent application Ser. No. 13/274,501 entitled "Request and Response Characteristics based Adaptation of Distributed Caching In A Mobile Network", which was filed on Oct. 17, 2011, the contents of which are herein incorporated by reference

BACKGROUND

Wireless Broadband networks, such those defined by EDGE, GPRS, EVDO, EVDV, UMTS and others, have given little attention to requirements posed by applications whose functions are based on actions initiated autonomously by the device, application or service, in contrast to functions initiated by the. Such applications include, for example, email, instant messaging, visual voicemail and voice and video telephony, and others. Such applications typically require an always-on IP connection and frequent transmit of small bits of data. Wireless Broadband networks are designed and optimized for high-throughput of large amounts of data, not for applications that require frequent, but low-throughput and/or small amounts of data.

Each transaction puts the mobile device radio in a high power mode for considerable length of time—typically between 15-30 seconds. As the high power mode can consume as much as 100× the power as an idle mode, these autonomously initiated applications quickly drain battery in Wireless Broadband networks. The issue has been further exacerbated by the rapid increase of popularity of applications with autonomously-initiated functionalities, such as mobile gaming, social media, news feeds, streaming video and audio, and others which may require an always-on of frequent IP connections and frequent transmit of small bits of data.

As such, applications (e.g., mobile applications) have changed the needs of caching, transport and content management. Traditional caching strategies are no longer suitable as when wireless standards were specified, there was little attention to requirements posed by applications whose functions are based on actions initiated by the network, compared to functions initiated by the user or by the device.

BRIEF DESCRIPTION OF THE DRAWINGS

FIG. 4B depicts an interaction diagram showing how application polls for content from an application server/content provider which employs cache-defeating mechanisms in content identifiers (e.g., identifiers intended to defeat caching) in a wireless network can still be detected and locally cached.

DETAILED DESCRIPTION

Figure 1A:
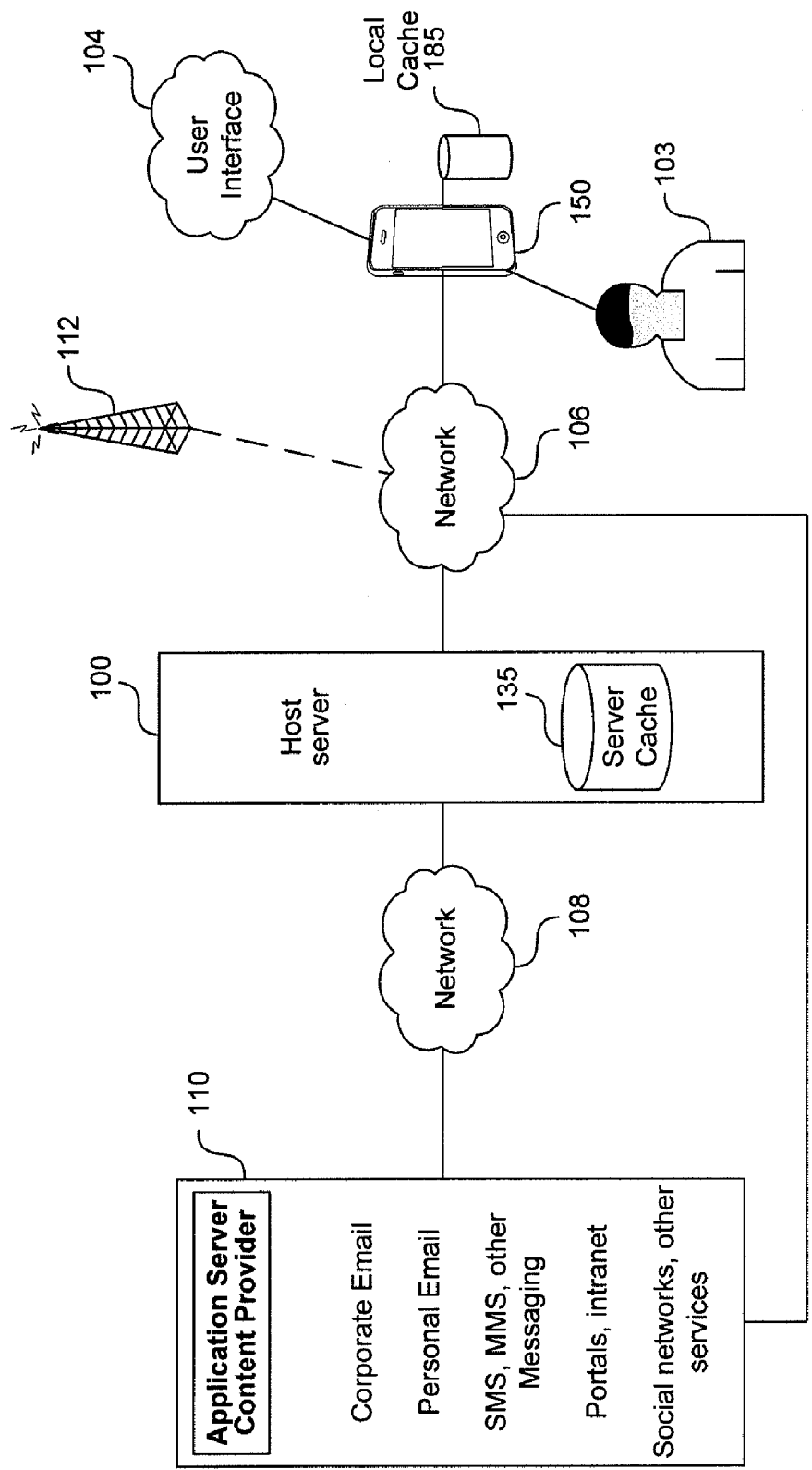
FIG. 1A illustrates an example diagram of a system where a host server facilitates management of traffic, content caching, and/or resource conservation between mobile devices (e.g., wireless devices) and an application server or content provider in a wireless network (or broadband network) for resource conservation.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for cache defeat detection and, whereby the content is otherwise cacheable, caching of content addressed by identifiers intended to defeat cache.

One embodiment of the disclosed technology includes, a system that optimizes multiple aspects of the connection with wired and wireless networks and devices through a comprehensive view of device and application activity including: loading, current application needs on a device, controlling the type of access (push vs. pull or hybrid), location, concentration of users in a single area, time of day, how often the user interacts with the application, content or device, and using this information to shape traffic to a cooperative client/server or simultaneously mobile devices without a cooperative client. Because the disclosed server is not tied to any specific network provider it has visibility into the network performance across all service providers. This enables optimizations to be applied to devices regardless of the operator or service provider, thereby enhancing the user experience and managing network utilization while roaming. Bandwidth has been considered a major issue in wireless networks today. More and more research has been done related to the need for additional bandwidth to solve access problems—many of the performance enhancing solutions and next generation standards, such as those commonly referred to as 4G, namely LTE, 4G, and WiMAX are focused on providing increased bandwidth. Although partially addressed by the standards a key problem that remains is lack of bandwidth on the signaling channel more so than the data channel.

Embodiments of the disclosed technology includes, for example, alignment of requests from multiple applications to minimize the need for several polling requests; leverage specific content types to determine how to proxy/manage a connection/content; and apply specific heuristics associated with device, user behavioral patterns (how often they interact with the device/application) and/or network parameters.

Embodiments of the present technology can further include, moving recurring HTTP polls performed by various widgets, RSS readers, etc., to remote network node (e.g., Network Operation Center (NOC)), thus considerably lowering device battery/power consumption, radio channel signaling, and bandwidth usage. Additionally, the offloading can be performed transparently so that existing applications do not need to be changed.

In some embodiments, this can be implemented using a local proxy on the mobile device (e.g., any wireless device) which automatically detects recurring requests for the same content (RSS feed, Widget data set) that matches a specific rule (e.g., happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile or wireless device (e.g., a mobile phone, smart phone, M2M module/MODEM, or any other wireless devices, etc.) does not need to open up (e.g., thus powering on the radio) or use a data connection if the request is for content that is monitored and that has been not flagged as new/changed.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server.

For example, when the request comes at an unscheduled/unexpected time (user initiated check), or after every (n) consecutive times the response has been provided from the cache, etc., or if the application is running in the background vs. in a more interactive mode of the foreground. As more and more applications (e.g., mobile applications) or wireless enabled applications base their features on resources available in the network, this becomes increasingly important. In addition, the disclosed technology allows elimination of unnecessary chatter from the network, benefiting the operators trying to optimize the wireless spectrum usage.

Intelligent Cache Management of Non-Cacheable Content

By detecting the rate and type of requests to a content source or application server (which may be identified by identifiers such as a URI or URL), combined with determining the state information of the mobile device (e.g., whether the backlight is on or off) or the user, the distributed proxy system (e.g., the local proxy (e.g., on the mobile device 150 of FIGS. 1A-B) and/or the proxy server (e.g., on the host server 100 of FIG. 1A-B)) can, for example, determine the difference between content that is automatically refreshed, programmatically refreshed or content that is requested by the user in the foreground. Using this information, along with the network conditions such as the TCP connection delay, bandwidth availability, network congestion/failure information, and/or Round Trip Time (RTT), current radio coverage statistics, the disclosed proxy system can determine whether to and when to cache content locally on the mobile devicemobile device (e.g., any wireless device), to satisfy future content requests. If content is already cached, then the cached version can be presented to the user. If not, the request is passed through over the mobile network to the content server/host (e.g., server/host 110 of FIGS. 1A-1B) and the freshly retrieved content can be presented to the requesting client/application (e.g., mobile application) on the mobile device (e.g., mobile device 150 of FIGS. 1A-1B).

To preserve user experience (or user perception), the disclosed distributed proxy system can determine and utilize the "criticality of an application" as a factor. For example, financial applications may be considered time critical so that these application requests are not cached but instead allowed to go over the wireless broadband or the mobile network to retrieve current data. An application, by name or type, can be considered critical at the time of provisioning or determined by programmatic observation of user interaction over time. That is, the sever-side component (e.g., host server 100 of FIG. 1A-1B) of the distributed proxy system can be provisioned with "profiles" which indicate the criticality of the application and/or additional application or user information. This profile can be communicated to the device side component (e.g., local proxy 175 of FIG. 1B) of the proxy system during initialization or subsequent establishment of polling requests.

A set of criteria (e.g., including application profile information) can be applied to content sources/application servers (e.g., each associated resource or resource identifier) to determine the suitability of related content for caching (size, etc.). The profile can further be used to identify applications for which caching will typically not be appropriate, such as the Google Market. Additionally, the pattern (e.g., periodicity or time interval) of each request as identified by a specific identifier (e.g., a resource of resource identifier) associated with a content source/application server can be monitored by the distributed system such that polling behavior can be determined, and the content cached accordingly.

When content from a content source/application server has been identified as suitable for caching, a message can be transmitted to the server-side component of the disclosed proxy system requesting that that the content associated with the content source/application server be monitored for changes. When the server detects that the content has been altered, the server transmits a message to the device-side component instructing it to invalidate whatever cache elements are associated with that URI.

In some instances, memory usage parameters of a mobile device (e.g., as described by the carrier configuration) are factored in when caching. As such, the client-side component of the disclosed distributed proxy will usually not use more than the specified percentage of available memory space for cache entries (e.g., as specified by the device manufacturer, operating system, applications, etc.). In addition to total memory usage, the client-side component of the distributed proxy can implement a configurable limit on the total number of cache entries stored across multiple applications or on a per-application basis.

Cache entries stored on the mobile device (e.g., any wireless device) can be aged out automatically by the client-side component of the distributed proxy as determined, for example, by configurable parameters (e.g., by the user, based on application-need, network service provider requirements, OS requirements, etc.). Additionally, cache elements may be removed to remain in compliance with disk usage or entry count restrictions. In some instances, the client-side component (local proxy) can invalidate the entire cache storage should the server-side proxy (proxy server) become unavailable. In one embodiment, the client-side component of the distributed proxy system can encrypt cached content.

Recognizing and Detecting "Cache-Defeating" Applications

For certain applications, caching may not be suitable depending on the type of content, the nature of the content, or user experience may be compromised, for example, applications with time sensitive data (e.g., financial stock information) where content changes frequently and may be time-critical to a user. To implement this, the disclosed system can, for example, maintain a list of "cache-defeating" clients and applications to process. The HTTP traffic generated by applications from this list can be inspected for known "cache-defeating" patterns (see below).

Traffic and applications which are not recognized as being cache-defeating and the traffic from other applications can be processed outside of the "cache-defeating" management processes. For example, if they employ cache-defeating URIs no caching will be performed. In one embodiment, to decide on whether caching is to be employed for a given request or requests directed to a given content source (e.g., application server and/or content provider), the identifier (e.g., URI or URL) associated with the request can processed and analyzed to (a) determine which mobile client or application (e.g., mobile application) has sent the request generating the traffic and/or (b) determine whether the content source to which the request is directed is attempting to defeat caches through various cache-defeating mechanisms.

Processing "Cache-Defeating" Identifiers (URIs/URLs)

Each processed application has a profile that can be used by the client/device-side proxy to process application-generated URI or other data. The disclosed technology recognizes the identifier (e.g., URI) format for key applications with "cache-defeating" URIs or other types of identifiers (e.g., those on the cache-defeating list). This is done by converting the incoming URI into a "normalized" URI and comparing that with the existing cache entries.

A majority of the cache defeaters employ a schema where a changing number or parameter is attached to or included in the identifier (URI/URL). A "normalized" URI refers to an identifier (URI/URI) where this number has been removed or otherwise modified to eliminate the effect of the URI on the hash value of the identifier. Existing cache entries are stored and accessed using the "normalized" URI as a key (e.g., via a lookup table). If content/responses for the URI is already cached and the server-side proxy is monitoring it for content changes/updates, then the proxy (e.g., including the device/client-side local proxy and/or the server-side proxy server) makes a decision to determine if the response can be made using the data stored in the local cache (e.g., local being on the mobile device). The decision is based on the application current background/foreground status and application class (as described below).

If the URI is not cached, then this HTTP request can then be processed by regular HTTP processing. The response can be read and the decision is made on whether or not to cache the content at this point. The decision can be based on any suitable criteria, such as identical content being returned in response to multiple requests, but can also be based on a more complicated analysis (such as being based on application characteristics by using application profiles which may evolve over time and/or dynamic in general based on various conditions). If the content is cached, a request to the proxy server is made to set up monitoring of the application server/content host for content changes to ensure that fresh content, or near-fresh content, is provided to the user and/or acknowledged by the distributed proxy. The parts of this request may include the original, non-normalized URI, poll frequency, and time-to-live information.

The server makes the request using the provided URI and caches the content or unique metric of the content behind this URI for future comparisons. Using the detected polling schedule (as described below) the server makes decisions whether the device needs to be updated with the new content or not. Some example caching processes are illustrated below for time/date parameter and random number parameter detection: CASE 1: TIME AND DATE DETECTION Time and/or date parameters can be identified by identifying time/date formats, for example, some of the formats are specified by Android in the documents at: http://developer-.android.com/reference/java/util/Date.html. The contents of which are incorporated by reference herein.

Some date/time formats that can be detected include: YYYYMMDDHHIISS and results in the following example URLs: http://www.somedomain.com/xxx.cgi?date=20110711181120, Or http://www.somedomain.com/xxx.cgi?date=2011-07-11%1815:11:20, or http://www.somedomain.com/xxx.cgi?date=1310408111.

Date and time may be in a single parameter in the examples above, or in multiple parameters like the case of: http://www.somedomain.com/xxx.cgi?date=2011-07-11&time=1815:11:20. Additionally HTTP allows the following date formats in headers: Sun, 6 Nov. 1994 08:49:37 GMT; Sunday, 06-Nov.-94 08:49:37 GMT; Sun Nov 6 08:49:37 1994.

In detecting the parameters for the purposes of caching, some example processes include the following 1) the parameter format is generally identified, rather than the name of the parameter. For example, a parameter might have any name but have a date/time format; 2) in general changing parameters are detected and identified, rather than static parameters; 3) In some instances, parameters such as dates and times changing within a tolerance (within 20% of processing them) are detected and processed for normalization, and 4) Content which does not change between polls is cached.

For example, consider the following request response pairs:

1. REQUEST=http://www.somedomain.com/xxx.cgi?x=5&y=10&t=1310408111
RESPONSE=Z
2. REQUEST=http://www.somedomain.com/xxx.cgi?x=5&y=10&t=1310409311
RESPONSE=Z
3. REQUEST=http://www.somedomain.com/xxx.cgi?x=5&y=10&t=1310411111
RESPONSE=Z The system detects what is changing, in this case, it is detected that 1) t changes between request 1 and 2; 2) t is formatted in length as unix time; 3) a comparison of current unix time to t is within 20% tolerance; 3) content does not change after three consecutive polls.

We can then conclude t=unix time and: 1. cache the response Z; 2. send a start poll with a marker in the position of the parameter "t" like:

START_POLL http://www.somedomain.com/xxx.cgi?x=5&y=10&t=#EPOCH#
HASH OF CONTENT 1. the server then begins to poll the resource inserting UNIX TIME of #EPOCH#

Date without DOES matter as we could cross a midnight boundary so we want to detect those as well and escape those for the server. The server always replaces the escape with the correct date or time. Some example URLs include:

EXAMPLE: http://www.somedomain.com/xxx.cgi?date=2011071118151120
CONVERT: START_POLL
http://www.somedomain.com/
   xxx.cgi?date=#YYYYMMDDHHMMSSMS#
INITIALIZE: date=2011071118151120
Hash of Content
EXAMPLE: http://www.somedomain.com/xxx.cgi?date=2011-07-11%1815:11:20
CONVERT: START_POLL
   http://www.somedomain.com/xxx.cgi?date=#YYYY-MM-DD%HHMM:SS:MS#
INITIALIZE: date=2011-07-11%1815:11:20
HASH OF CONTENT In general, if a parameter is cannot be confirmed to be a date/time parameter, the system generally will not cache the content unless there is an application handler which instructs otherwise.

Random numbers in URLs can also be detected. Examples of such parameters can include, for example, long-poll idle timers and other such parameters. For example, 1. REQUEST=http://www.somedomain.com/xxx.cgi?x=5&idle=180
RESPONSE=Z
2. REQUEST=http://www.somedomain.com/xxx.cgi?x=5&idle=240
RESPONSE=Z
3. REQUEST=http://www.somedomain.com/xxx.cgi?x=5&idle=680
RESPONSE=Z In this case we not only detect a long poll event but we also can detect the idle time out parameter in the URL. Just as above we see the parameter idle changes, but the content hash does not. Further we can detect this is a long_poll event. So in the case we would start a long poll on the serve and ignore the changing parameter "idle" in the URL hash for caching purposes.

EXAMPLE (RANDOM NUMBER—RISKY, BUT RECOVERABLE)

This is the same case as above (LONG POLL) but no long poll activity is detected 1. REQUEST=http://www.somedomain.com/xxx.cgi?x=5&y=n
RESPONSE=Z
2. REQUEST=http://www.somedomain.com/xxx.cgi?x=5&y=n+i
RESPONSE=Z
3. REQUEST=http://www.somedomain.com/xxx.cgi?x=5&y=n*c
RESPONSE=Z In this case it can be detected that y is changing but it appears to have no impact on the response (a further way to optimize safety is to look for keywords like no-cache, etc. associated with the random number).

In this case with no-long poll, a normal start_poll excluding y from the hash and the last known 'y' value or another previous 'y' value can be sent to the server.

CONVERT: START_POLL http://www.somedomain.com/xxx.cgi?x=5&y=n*c
HASH OF CONTENT

If the server receives an error for the content source it will invalidate with a request to blacklist the URI to prevent subsequent caching. If the content does not match, in general, the content is not hashed.

Polling Schedule

Detecting (or determining) a polling schedule allows the proxy server (server-side of the distributed cache system) to be as close as possible with its polls to the application polls. Many applications employ scheduled interval polling (e.g., every 4 hours or every 30 seconds, at another time interval). The client side proxy can detect automatic polls based on time measurements and create a automatic polling profile for an application. As an example, the local proxy attempts to detect the time interval between requests and after 2, 3, 4, or more polls, determines an automatic rate if the time intervals are all within 1 second (or another measure of relative closeness) of each other. If not, the client may collect data from a greater number of polling events (e.g., 10-12 polls) and apply a statistical analysis to determine, compute, or estimate a value for the average interval that is used. The polling profile is delivered to the server where it is used. If it is a frequent manual request, the locally proxy can substitute it with a default interval for this application taken from a profile for non-critical applications.

In some embodiments, the local proxy (e.g., device side proxy) may keep monitoring the application/client polls and update the polling interval. If it changes by more than 30% (or another predetermined/dynamic/conditional value) from the current value, it is communicated to the proxy server (e.g., server-side proxy). This approach can be referred to as the scenario of "lost interest". In some instances, the local proxy can recognize requests made outside of this schedule, consider them "manual", and treat them accordingly.

Application Classes/Modes of Caching

In some embodiments, applications can be organized into three groups or modes of caching. Each mobile client/application can be categorized to be treated as one of these modes, or treated using multiple modes, depending on one or more conditions.

A) Fully cached—local proxy updates (e.g., sends application requests directly over the network to be serviced by the application server/content host) only when the proxy server tells the local proxy to update. In this mode, the local proxy can ignore manual requests and the proxy server uses the detected automatic profile (e.g., sports score applets, Facebook, every 10, 15, 30s. or more polls) to poll the application server/content provider.

B) partially cached—the local proxy uses the local or internal cache for automatic requests (e.g., application automatic refreshes), other scheduled requests but passes through some manual requests (e.g., email download, Ebay or some Facebook requests); and C) Never cached (e.g., real-time stock ticker, sports scores/statuses, however, in some instances, 15 minutes delayed quotes can be safely placed on 30 seconds schedule—B or even A).

The actual application or caching mode classification can be determined based on the rate of content change and critical character of data. Unclassified applications by default can be set as class C.

Backlight and Active Applications

In some embodiments, the local proxy starts by detecting the device backlight status. Requests made with the screen light "off" can be allowed to use the local cache if a request with identical signature is registered with the proxy server, which is polling the original host server/content server(s) to which the requests are directed. If the screen light is "on", further detection can be made to determine whether it is a background application or for other indicators that local cache entries can or cannot be used to satisfy the request. When identified, the requests for which local entries can be used may be processed identically to the screen light off situation. Foreground requests can use the aforementioned application classification to assess when cached data is safe to use to process requests.

FIG. 1A illustrates an example diagram of a system where a host server 100 facilitates management of traffic, content caching, and/or resource conservation between clients (e.g., mobile devices, any wireless device or clients/applications on client devices 150) and an application server or content provider 110 in a wireless network (or broad band network) 106 or 108 for resource conservation.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 will typically include a display and/or other output functionalities to present information and data exchanged between among the devices 150 and/or the host server 100 and/or application server/content provider 110.

For example, the client devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, a handheld tablet (e.g., an iPad or any other tablet), a hand held console, a hand held gaming device or console, any SuperPhone such as the iPhone, and/or any other portable, mobile, hand held devices, or fixed wireless interface such as a M2M device, etc. In one embodiment, the client devices 150, host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1B. Functions and techniques performed by the proxy and cache components in the client device 150, the host server 100, and the related components therein are described, respectively, in detail with further reference to the examples of FIG. 2-3.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1B:
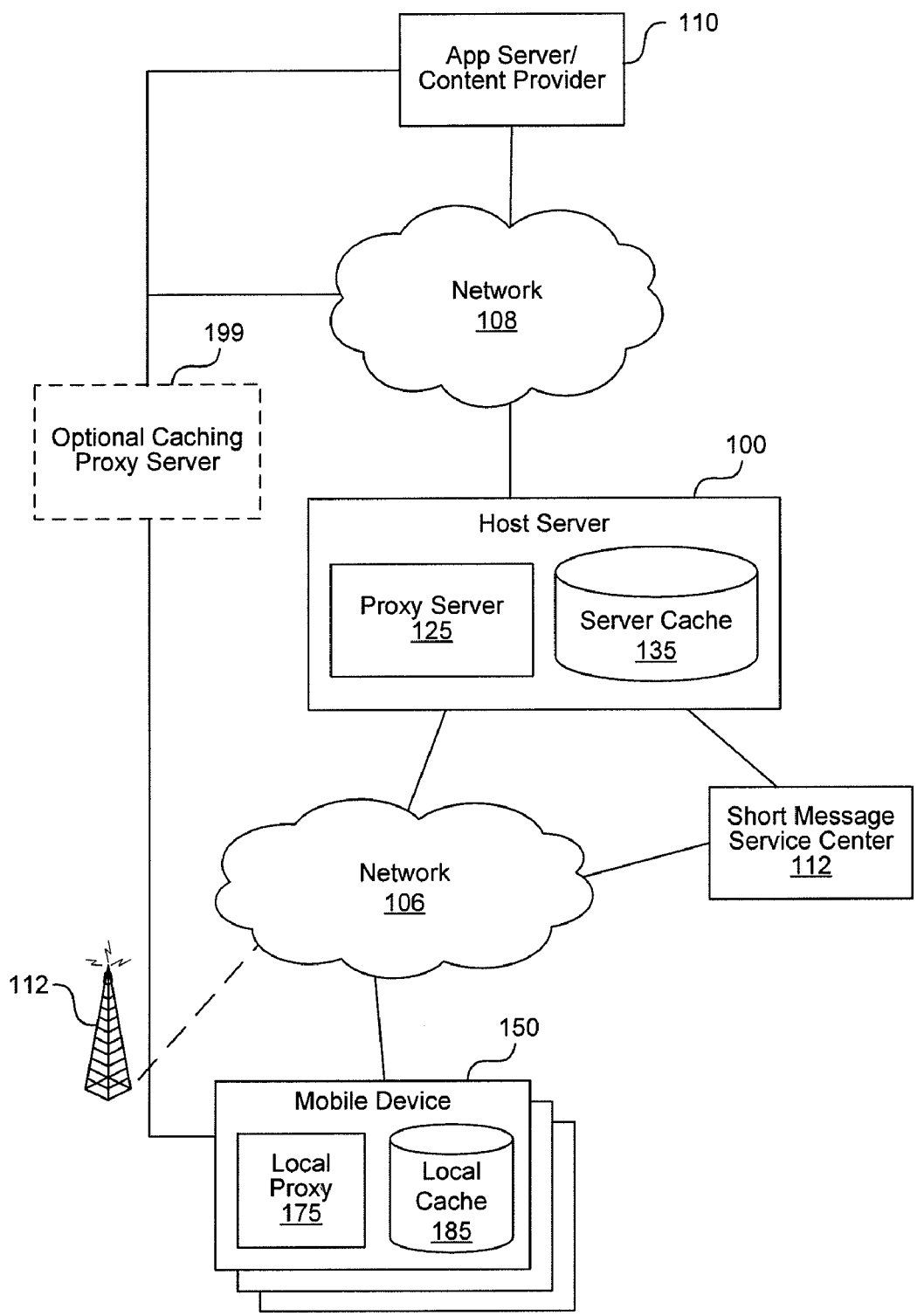
FIG. 1B illustrates an example diagram of a proxy and cache system distributed between the host server and device which facilitates network traffic management between a device and an application server/content provider for resource conservation.

FIG. 1B illustrates an example diagram of a proxy and cache system distributed between the host server 100 and device 150 which facilitates network traffic management between the device 150 and an application server/content provider 100 (e.g., a source server) for resource conservation and content caching.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2-3.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. As will be further described with reference to the example of FIG. 3, the host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transude the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 2A:
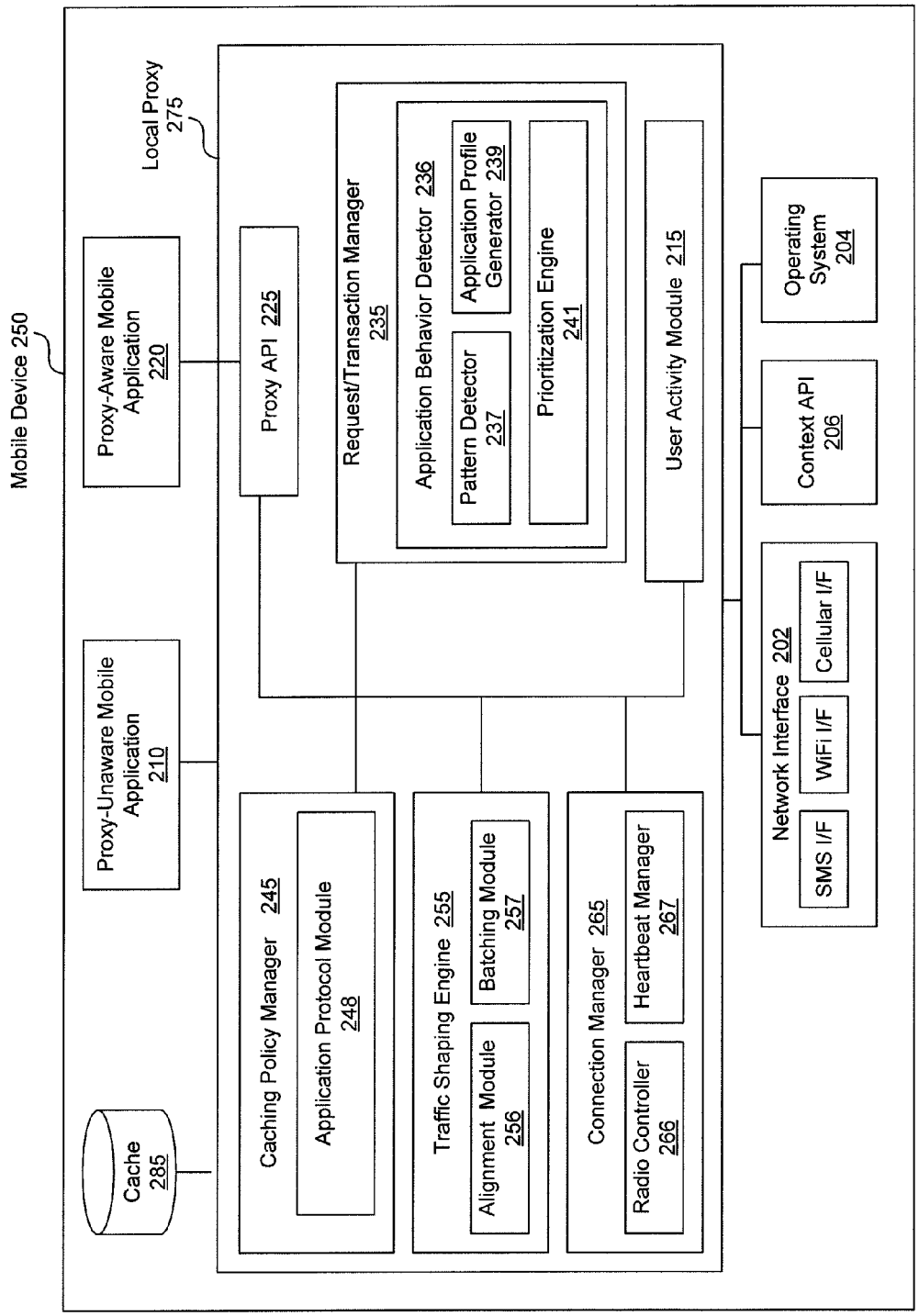
FIG. 2A depicts a block diagram illustrating an example of client-side components in a distributed proxy and cache system residing on a mobile device (e.g., wireless device) that manages traffic in a wireless network (or broadband network) for resource conservation, content caching, and/or traffic management.

FIG. 2A depicts a block diagram illustrating an example of client-side components in a distributed proxy and cache system residing on a device 250 that manages traffic in a wireless network for resource conservation, content caching, and/or traffic management.

The device 250, which can be a portable or mobile device (e.g., any wireless device), such as a portable phone, generally includes, for example, a network interface 208208 an operating system 204, a context API 206, and applications (e.g., mobile applications) which may be proxy-unaware 210 or proxy-aware 220. Note that the device 250 is specifically illustrated in the example of FIG. 2 as a mobile device, such is not a limitation and that device 250 may be any portable/mobile or non-portable device able to receive, transmit signals to satisfy data requests over a network including wired or wireless networks (e.g., WiFi, cellular, Bluetooth, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

Figure 3A:
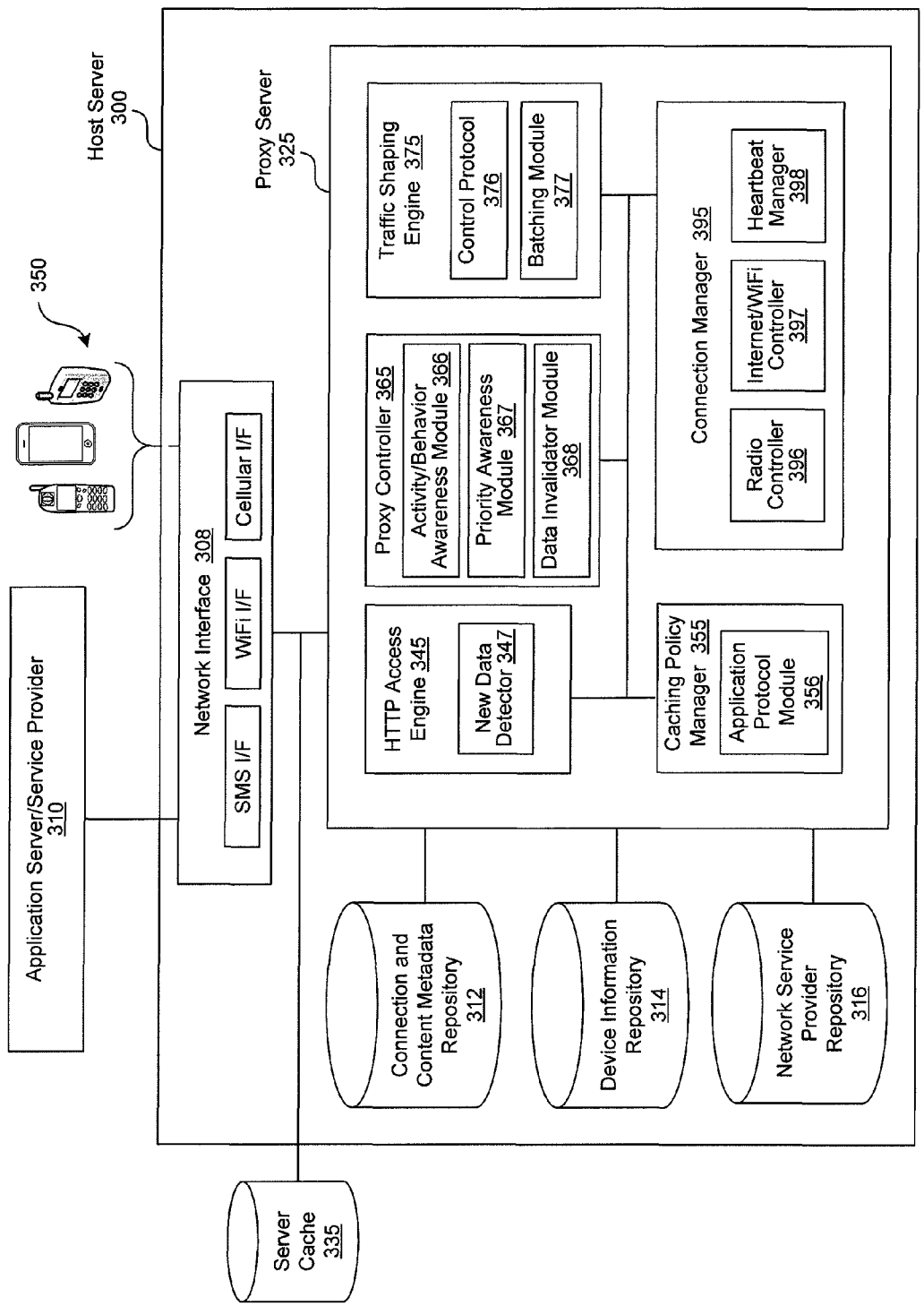
FIG. 3A depicts a block diagram illustrating an example of server-side components in a distributed proxy and cache system that manages traffic in a wireless network (or broadband network) for resource conservation, content caching, and/or traffic management.

The proxy 275 is generally application independent and can be used by applications (e.g., both proxy-aware and proxy-unaware applications 210 and 220 or mobile applications) to open TCP connections to a remote server (e.g., the server 100 in the examples of FIGS. 1A-1B and/or server proxy 125/325 shown in the examples of FIG. 1B and FIG. 3A). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 and 300 in the examples of FIGS. 1A-B and FIG. 3A) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIGS. 1A-B and FIG. 3A) send the data that was buffered as a result of the previously decreased communication frequency.

In addition, or in alternative, the local proxy 275 can communicate the characteristics of user activity at the device 250 to the remote device (e.g., host server 100 and 300 in the examples of FIGS. 1A-B and FIG. 3A) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with a application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync |
| (Un)read email | Low | | (Low if possible) |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Sever Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257), In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1A and FIG. 3A or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 325 of FIG. 3A) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3A) which forwards the data request to a content source (e.g., application server/content provider 110 of FIG. 1A) and a response from the content source can be provided through the remote proxy, as will be further described in the description associated with the example host server 300 of FIG. 3A. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 325 in the example of FIG. 3A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 125 of FIG. 1B or proxy server 325 of FIG. 3A) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 300 as shown in the example of FIG. 3A.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
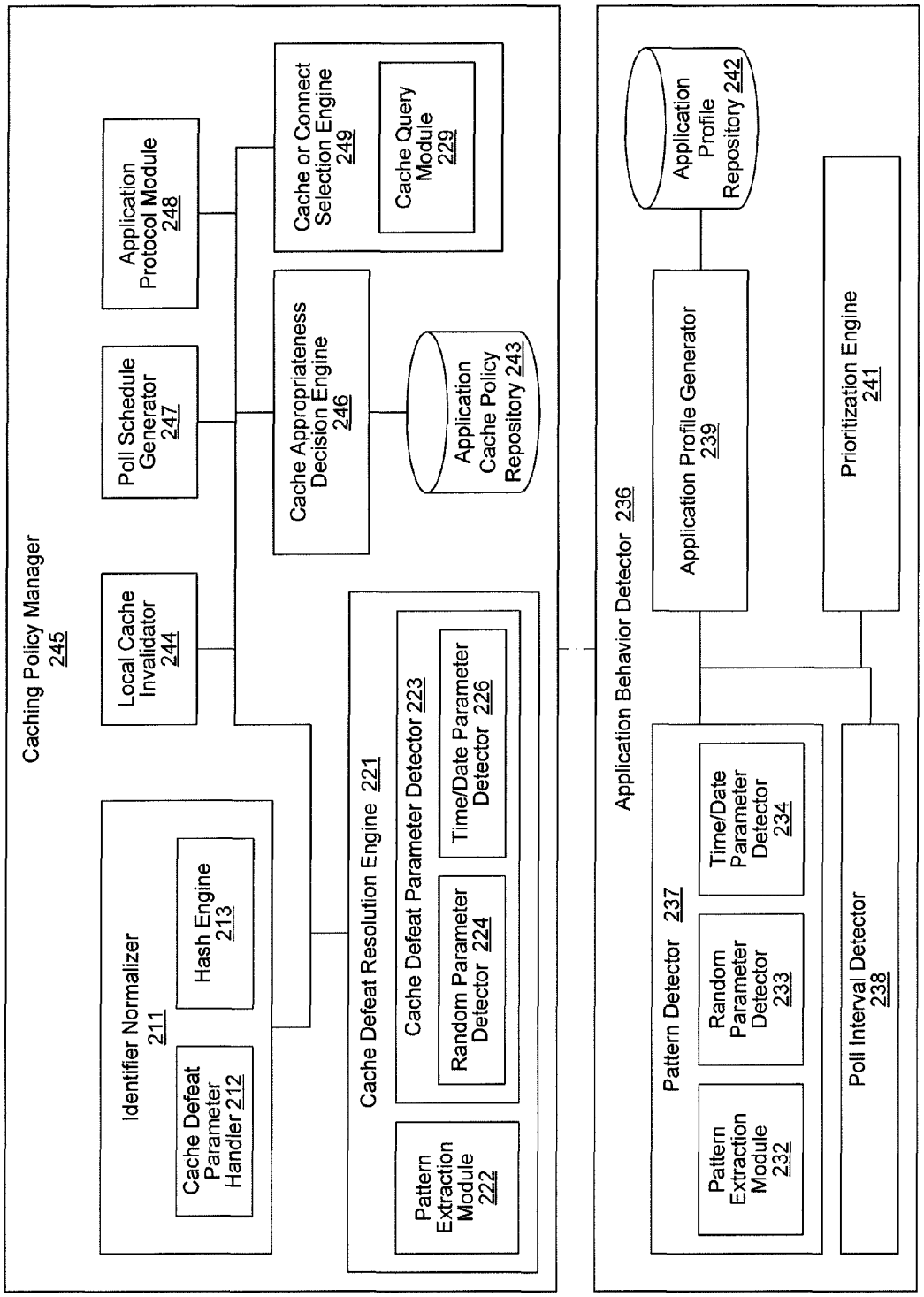
FIG. 2B depicts a block diagram illustrating another example of components in the application behavior detector and the caching policy manager in the local proxy on the client-side of the distributed proxy system shown in the example of FIG. 2A which is capable of detecting cache defeat and perform caching of content addressed by identifiers intended to defeat cache.

FIG. 2B depicts a block diagram illustrating another example of components in the application behavior detector 236 and the caching policy manager 245 in the local proxy 275 on the client-side of the distributed proxy system shown in the example of FIG. 2A. The illustrated application behavior detector 236 and the caching policy manager 245 can for example, enable the local proxy 275 to detect cache defeat and perform caching of content addressed by identifiers intended to defeat cache.

In one embodiment, the caching policy manager 245 includes a cache defeat resolution engine 221, an identifier formalizer 211, a cache appropriateness decision engine 246, a poll schedule generator 247, an application protocol module 248, a cache or connect selection engine 249 having a cache query module 229, and/or a local cache invalidator 244. The cache defeat resolution engine 221 can further include a pattern extraction module 222 and/or a cache defeat parameter detector 223. The cache defeat parameter detector 223 can further include a random parameter detector 224 and/or a time/date parameter detector 226. One embodiment further includes an application cache policy repository 243 coupled to the decision engine 246.

In one embodiment, the application behavior detector 236 includes a pattern detector 237, a poll interval detector 238, an application profile generator 239, and/or a priority engine 241. The pattern detector 237 can further include a cache defeat parameter detector 223 having also, for example a random parameter detector 233 and/or a time/date parameter detector 234. One embodiment further includes an application profile repository 242 coupled to the application profile generator 239. The application profile generator 239, and the priority engine 241 have been described in association with the description of the application behavior detector 236 in the example of FIG. 2A.

The cache defeat resolution engine 221 can detect, identify, track, manage, and/or monitor content or content sources (e.g., servers or hosts) which employ identifiers and/or are addressed by identifiers (e.g., resource identifiers such as URLs and/or URIs) with one or more mechanisms that defeat cache or are intended to defeat cache. The cache defeat resolution engine 221 can, for example, detect from a given data request generated by an application or client that the identifier defeats or potentially defeats cache, where the data request otherwise addresses content or responses from a host or server (e.g., application server/content host 110 or 310) that is cacheable.

In one embodiment, the cache defeat resolution engine 242 detects or identifies cache defeat mechanisms used by content sources (e.g., application server/content host 110 or 310) using the identifier of a data request detected at the mobile device 250. The cache defeat resolution engine 221 can detect or identify a parameter in the identifier which can indicate that cache defeat mechanism is used. For example, a format, syntax, or pattern of the parameter can be used to identify cache defeat (e.g., a pattern, format, or syntax as determined or extracted by the pattern extraction module 222).

Figure 7A:
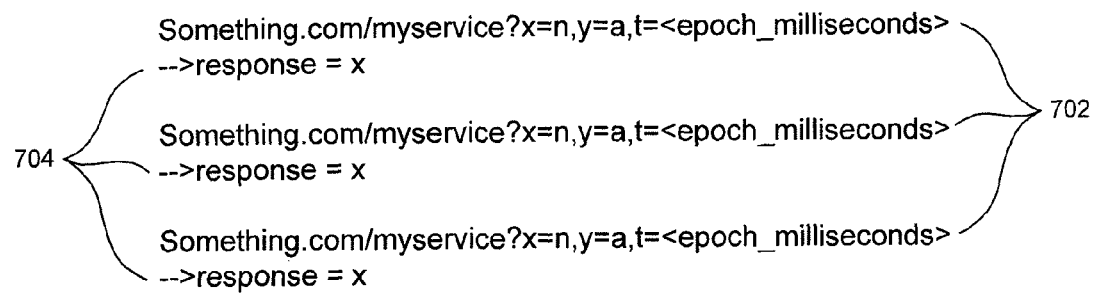
FIG. 7A-B depicts example request-response pairs showing cacheable responses addressed by identifiers with changing parameters.

The pattern extraction module 222 can parse an identifier into multiple parameters or components and perform a matching algorithm on each parameter to identify any of which match one or more predetermined formats (e.g., a date and/or time format, as illustrated in parameters 702 shown in FIG. 7A). The results of the matching or the parsed out parameters from an identifier can be used (e.g., by the cache defeat parameter detector 221) to identify cache defeating parameters which can include one or more changing parameters, for example.

The cache defeat parameter detector 221, in one embodiment, can detect random parameters (e.g., by the random parameter detector 224) and/or time and/or date parameters which are typically used for cache defeat. The cache defeat parameter detector 221 can detect random parameters (e.g., as illustrated in parameters 752 shown in FIG. 7B) and/or time/dates using commonly employed formats for these parameters and performing pattern matching algorithms and tests.

Figure 7B:
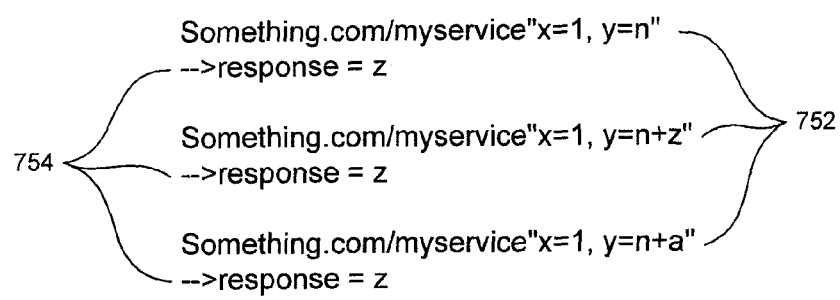

In addition to detecting patterns, formats, and/or syntaxes, the cache defeat parameter detector 221 further determines or confirms whether a given parameter is defeating cache and whether the addressed content can be cached by the distributed caching system. The cache defeat parameter detector 221 can detect this by analyzing responses received for the identifiers utilized by a given data request. In general, a changing parameter in the identifier is identified to indicate cache defeat when responses corresponding to multiple data requests are the same even when the multiple data requests uses identifiers with the changing parameter being different for each of the multiple data requests. For example, the request/response pairs shown in the examples of FIG. 7A and FIG. 7B illustrate that the responses (704 in FIGS. 7A and 754 in FIG. 7B) received are the same, even though the resource identifier includes a parameter (702 in FIGS. 7A and 752 in FIG. 7B) that changes with each request.

For example, at least two same responses may be required to identify the changing parameter as indicating cache defeat. In some instances, at least three same responses may be required. The requirement for the number of same responses needed to determine that a given parameter with a varying value between requests is cache defeating may be application specific, context dependent, and/or user dependent/user specified, or a combination of the above. Such a requirement may also be static or dynamically adjusted by the distributed cache system to meet certain performance thresholds and/or either explicit/implicit feedback regarding user experience (e.g., whether the user or application is receiving relevant/fresh content responsive to requests). More of the same responses may be required to confirm cache defeat, or for the system to treat a given parameter as intended for cache defeat if an application begins to malfunction due to response caching and/or if the user expresses dissatisfaction (explicit user feedback) or the system detects user frustration (implicit user cues).

The cache appropriateness decision engine 246 can detect, assess, or determine, whether content from a content source (e.g., application server/content provider 110 in the example of FIG. 1B) with which a mobile device 250 interacts, has content that may be suitable for caching. In some instances, content from a given application server/content provider (e.g., the server/provider 110 of FIG. 1B) is determined to be suitable for caching based on a set of criteria, for example, criteria specifying time criticality of the content that is being requested from the content source. In one embodiment, the local proxy (e.g., the local proxy 175 or 275 of FIG. 1B and FIG. 2A) applies a selection criteria to store the content from the host server which is requested by an application as cached elements in a local cache on the mobile device to satisfy subsequent requests made by the application.

The selection criteria can also include, by way of example, but not limitation, state of the mobile device indicating whether the mobile device is active or inactive, network conditions, and/or radio coverage statistics. The cache appropriateness decision engine 246 can any one or any combination of the criteria, and in any order, in identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIG. 1B and FIG. 2A, respectively) on the mobile device 250. The content source can also be identified to a proxy server (e.g., proxy server 125 or 325 shown in the examples of FIG. 1B and FIG. 3A, respectively) remote from and in wireless communication with the mobile device 250 such that the proxy server can monitor the content source (e.g., application server/content provider 110) for new or changed data. Similarly, the local proxy (e.g., the local proxy 175 or 275 of FIG. 1B and FIG. 2A, respectively) can identify to the proxy server that content received from a specific application server/content provider is being stored as cached elements in the local cache.

In one embodiment, cache elements are stored in the local cache 285 as being associated with a normalized version of an identifier, for example, for an identifier employing one or more parameters intended to defeat cache. The identifier can be normalized by the identifier normalize module 211 and the normalization process can include, by way of example, one or more of, converting the URI scheme and host to lower-case, capitalizing letters in percent-encoded escape sequences, removing a default port, and removing duplicate slashes.

In one embodiment, the identifier is normalized by removing the parameter for cache defeat and/or replacing the parameter with a static value which can be used to address or be associated with the cached response received responsive to a request utilizing the identifier by the normalizer 211 or the cache defeat parameter handler 212. For example, the cached elements stored in the local cache 285 (shown in FIG. 2A) can be identified using the normalized version of the identifier or a hash value of the normalized version of the identifier. The hash value of an identifier or of the normalized identifier may be generated by the hash engine 213.

Once content has been locally cached, the cache policy manager 245 can, upon receiving future polling requests to contact the content server, retrieve the cached elements from the local cache to respond to the polling request made at the mobile device 250 such that a radio of the mobile device is not activated to service the polling request. Such servicing and fulfilling application (e.g., mobile application) requests locally via a local cache entries allow for more efficient resource and mobile network traffic utilization and management since network bandwidth and other resources need not be used to request/receive poll responses which may have not changed from a response that has already been received at the mobile device 250.

One embodiment of the cache policy manager 245 includes a poll schedule generator 247 which can generate a polling schedule for one or more applications on the mobile device 250. The polling schedule can specify a polling interval that can be employed by the proxy server (e.g., proxy server 125 or 325 shown in the examples of FIG. 1B and FIG. 3A) in monitoring the content source for one or more applications. The polling schedule can be determined, for example, based on the interval between the polling requests directed to the content source from the mobile device. In one embodiment, the poll interval detector 238 of the application behavior detector can monitor polling requests directed to a content source from the mobile device 250 in order to determine an interval between the polling requests made from any or all mobile application.

In one embodiment, the cache policy manager 245 sends the polling schedule is sent to the proxy server (e.g., proxy server 125 or 325 shown in the examples of FIG. 1B and FIG. 3A) and can be used by the proxy server in monitoring the content source, for example, for changed or new content. The local cache invalidator 244 of the caching policy manager 245 can invalidate cache elements in the local cache (e.g., cache 185 or 285) when new or changed data is detected from the application server/content source for a given request. The new or changed data can be, for example, detected by the proxy server. When a cache entry for a given request/poll has been invalidated and/or removed (e.g., deleted from cache) after invalidation, the use of the radio on the mobile device 250 can be enabled (e.g., by the local proxy or the cache policy manager 245) to satisfy the subsequent polling requests, as further described with reference to the interaction diagram of FIG. 4B.

In one embodiment, the proxy server (e.g., proxy server 125 or 325 shown in the examples of FIG. 1B and FIG. 3A) uses a modified version of a resource identifier used in a data request to monitor a given content source (the application server/content host 110 of FIG. 1A and FIG. 1B to which the data request is addressed) for new or changed data. For example, in the instance where the content source or identifier is detected to employ cache defeat mechanisms, a modified (e.g., normalized) identifier can be used instead to poll the content source. The modified or normalized version of the identifier can be communicated to the proxy server by the caching policy manager 245, or more specifically the cache defeat parameter handler 212 of the identifier normalizer 211, for example.

The modified identifier used by the proxy server to poll the content source on behalf of the mobile device/application (e.g., mobile application) may or may not be the same as the normalized identifier. For example, the normalized identifier may be the original identifier with the changing cache defeating parameter removed whereas the modified identifier uses a substitute parameter in place of the parameter that is used to defeat cache (e.g., the changing parameter replaced with a static value or other predetermined value known to the local proxy and/or proxy server). The modified parameter can be determined by the local proxy 275 and communicated to the proxy server. The modified parameter may also be generated by the proxy server (e.g., by the identifier modifier module 353 shown in the example of FIG. 3B).

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request, made by an application (e.g., mobile application) on the mobile device, to contact the application server/content provider. The selection engine 249 can determine whether the content received for the intercepted request has been locally stored as cache elements for deciding whether the a radio of the mobile device needs to be activated to satisfy the request made by the mobile application. In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the mobile application.

In one embodiment, the cached elements stored in the local cache 285 (shown in FIG. 2A) can be identified using a normalized version of the identifier or a hash value of the normalized version of the identifier, for example, using the cache query module 229. Cached elements can be stored with normalized identifiers which have cache defeating parameters removed or otherwise replaced such that the relevant cached elements can be identified and retrieved in the future to satisfy other requests employing the same type of cache defeat. For example, when an identifier utilized in a subsequent request is determined to be utilizing the same cache defeating parameter, the normalized version of this identifier can be generated, and used to identify a cached response stored in the mobile device cache to satisfy the data request. The hash value of an identifier or of the normalized identifier may be generated by the hash engine 213 of the identifier normalizer 211.

FIG. 3A depicts a block diagram illustrating an example of server-side components (host server 300 and proxy server 325) in a distributed proxy and cache system that manages traffic in a wireless network for resource conservation, content caching, and/or traffic management.

The host server 300 generally includes, for example, a network interface 308 and/or one or more repositories 312, 314, 316. Note that server 300 may be any portable/mobile or non-portable device, server, cluster of computers and/or other types of processing units (e.g., any number of a machine shown in the example of FIG. 11) able to receive, transmit signals to satisfy data requests over a network including any wired or wireless networks (e.g., WiFi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 308 to communicate with multiple devices including mobile phone devices 350, and/or one or more application servers/content providers 310.

The host server 300 can store information about connections (e.g., network characteristics, conditions, types of connections, etc.) with devices in the connection metadata repository 312. Additionally, any information about third party application or content providers can also be stored in 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by network interface 308 allows for simultaneous connections (e.g., including cellular connections) with devices 350 and/or connections (e.g., including wired/wireless, HTTP, Internet connections, LAN, WiFi, etc.) with content servers/providers 310, to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, WiFi interface, interfaces for various generations of mobile communication standards including but not limited to 1G, 2G, 3G, 3.5G, 4G type networks such as, LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 300 can further include, server-side components of the distributed proxy and cache system which can include, a proxy server 325 and a server cache 335. In one embodiment, the proxy server 325 can include an HTTP access engine 345, a caching policy manager 355, a proxy controller 365, a traffic shaping engine 375, a new data detector 347 and/or a connection manager 395.

The HTTP access engine 345 may further include a heartbeat manager 398 the proxy controller 365 may further include a data invalidator module 358 the traffic shaping engine 375 may further include a control protocol 376 and a batching module 377. Additional or less components/modules/engines can be included in the proxy server 325 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an application server or content provider 310, the request may be intercepted and routed to the proxy server 325, which is coupled to the device 350 and the application server/content provider 310. Specifically, the proxy server is able to communicate with the local proxy (e.g., proxy 175 and 275 of the examples of FIG. 1 and FIG. 2 respectively) of the mobile device 350, the local proxy forwards the data request to the proxy server 325 for, in some instances, further processing, and if needed, for transmission to the application server/content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365, via information collected by the local proxy on the device 350.

In one embodiment, communication frequency can be controlled by the connection manager 395 of the proxy server 325, for example, to adjust push frequency of content or updates to the device 350. For instance, push frequency can be decreased by the connection manager 395 when characteristics of the user activity indicate that the user is inactive. In one embodiment, when the characteristics of the user activity indicate that the user is subsequently active after a period of inactivity, the connection manager 395 can adjust the communication frequency with the device 350 to send data that was buffered as a result of decreased communication frequency, to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use, when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness, as tracked by modules 366 and/or 367. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 325 can order the each messages/packets in a batch for transmission based on event/transaction priority, such that higher priority content can be sent first, in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example in the server cache 335, for subsequent retrieval or batch sending to the device 350 to potentially decrease the need to turn on the device 350 radio. The server cache 335 can be partially or wholly internal to the host server 300, although in the example of FIG. 3A, it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 110, a network service provider, or another third party.

In one embodiment, content caching is performed locally on the device 350 with the assistance of host server 300. For example, proxy server 325 in the host server 300 can query the application server/provider 310 with requests and monitor changes in responses. When changed or new responses are detected (e.g., by the new data detector 347), the proxy server 325 can notify the mobile device 350, such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new/changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, for example, through the activity/behavior awareness module 366, is able to identify or detect user activity, at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new or updated content is sent to the mobile device 350, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350, that would otherwise be performed by the device 350 through a wireless (e.g., including cellular connectivity). The host server can poll the sources 310 for new or changed data by way of the HTTP access engine 345 to establish HTTP connection or by way of radio controller 396 to connect to the source 310 over the cellular network. When new or changed data is detected, the new data detector can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance via the SMSC shown in the example of FIG. 1B. SMS is used to transmit invalidation messages, batches of invalidation messages, or even content in the case the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350, to maintain a backend connection with a provider 310 for applications running on devices 350.

For example, in the distributed proxy system, local cache on the device 350 can prevent any or all heartbeat messages needed to maintain TCP/IP connections required for applications, from being sent over the cellular, or other network, and instead rely on the proxy server 325 on the host server 300 to generate and/or send the heartbeat messages to maintain a connection with the backend (e.g., application server/provider 110 in the example of FIG. 1A). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 3B:
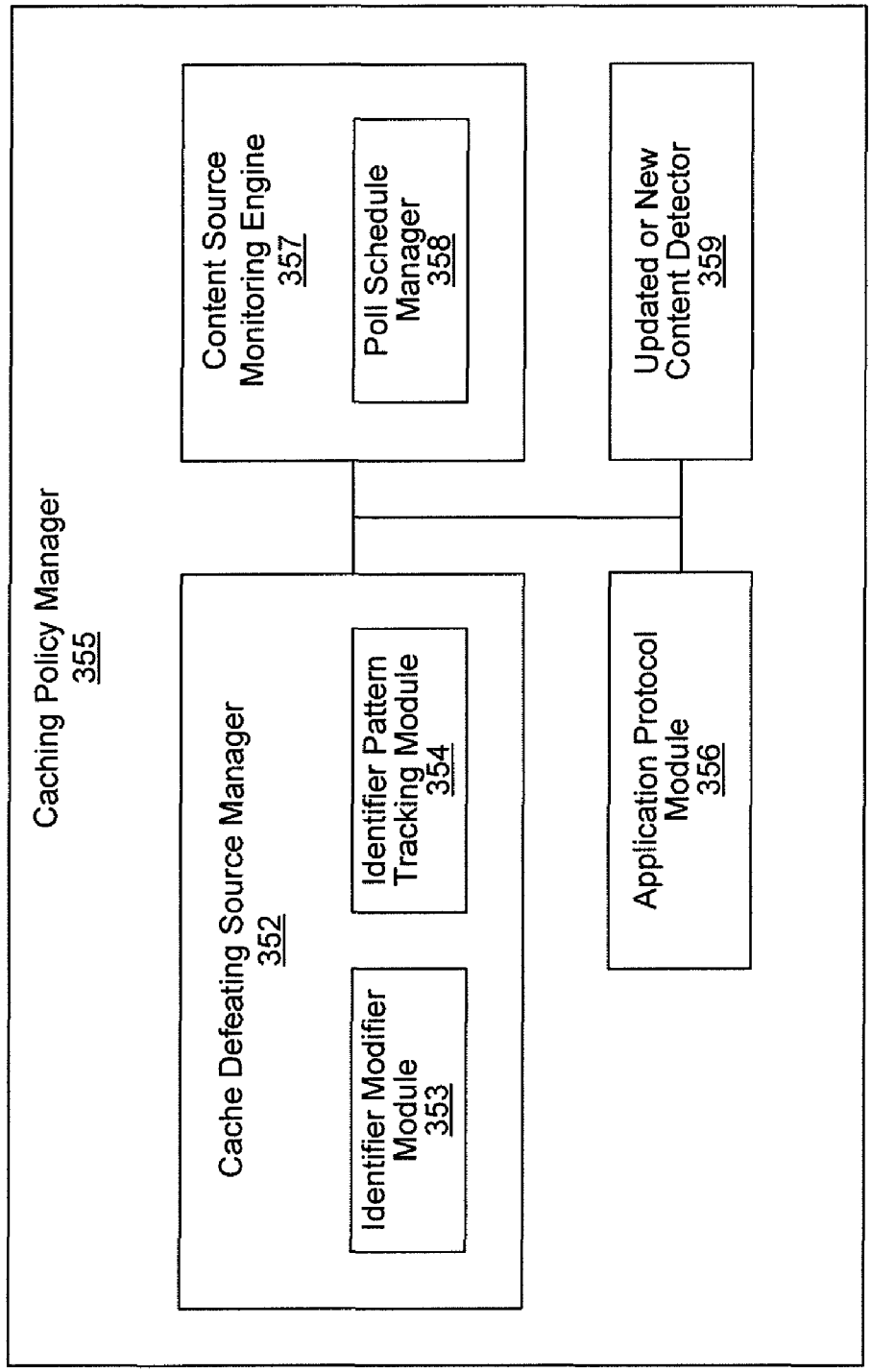
FIG. 3B depicts a block diagram illustrating another example of components in the caching policy manager in the proxy server on the server-side of the distributed proxy system shown in the example of FIG. 3A which is capable of managing and detecting cache defeating mechanisms and monitoring content sources.

FIG. 3B depicts a block diagram illustrating another example of components in the caching policy manager 355 in the proxy server 375 on the server-side of the distributed proxy system shown in the example of FIG. 3A which is capable of managing and detecting cache defeating mechanisms and monitoring content sources.

The caching policy manager 355, in one embodiment, can further include a cache defeating source manager 352, a content source monitoring engine 357 having a poll schedule manager 358, and/or an updated or new content detector 359. The cache defeating source manager 352 can further include an identifier modifier module 353 and/or an identifier pattern tracking module 354.

In one embodiment, the proxy server (e.g., the proxy server 125 or 325 of the examples of FIG. 1B and FIG. 3A) can monitor a content source for new or changed data, for example, via the monitoring engine 357. The content source (e.g., application server/content provider 110 of FIG. 1B or 310 of FIG. 3A) can be one that has been identified to the proxy server (e.g., by the local proxy) as having content that is being locally cached on a mobile device (e.g., mobile device 150 or 250). The content source 310 can be monitored, for example, by the monitoring engine 357 at a frequency that is based on polling frequency of the content source at the mobile device. The poll schedule can be, for example, generated by the local proxy and sent to the proxy server 325. The poll frequency can be tracked and/or managed by the poll schedule manager 358.

In one embodiment, the proxy server 325 uses a normalized identifier or modified identifier in polling the content source 310 to detect new or changed data (responses). The normalized identifier or modified identifier can also be used by the proxy server 325 in storing responses on the server cache 335. In general, the normalized or modified identifiers can be used when cache defeat mechanisms are employed for cacheable content. Cache defeat mechanisms can be in the form of a changing parameter in an identifier such as a URI or URL, and can include a changing time/data parameter, a randomly varying parameter, or other types parameters.

The normalized identifier or modified identifier removes or otherwise replaces the changing parameter for association with subsequent requests and identification of associated responses, and can also be used to poll the content source. In one embodiment, the modified identifier is generated by the cache defeating source manager 352 (e.g., the identifier modifier module 353) of the caching policy manager 355 on the proxy server 325 (server-side component of the distributed proxy system). The modified identifier can utilize a substitute parameter (which is generally static over a period of time) in place of the changing parameter that is used to defeat cache.

The cache defeating source manager 352 optionally includes the identifier pattern tracking module 354 to track, store, and monitor the various modifications of an identifier or identifiers that address content for one or more content sources (e.g., application server/content host 110 or 310) to continuously verify that the modified identifiers and/or normalized identifiers used by the proxy server 325 to poll the content sources work as predicted or intended (e.g., receive the same responses or responses that are otherwise still relevant compared to the original, unmodified identifier).

In the event that the pattern tracking module 354 detects a modification or normalization of an identifier that causes erratic or unpredictable behavior (e.g., unexpected responses to be sent) on the content source, the tracking module 354 can log the modification and instruct the cache defeating source manager 342 to generate another modification/normalization, or notify the local proxy (e.g., local proxy 275) to generate another modification/normalization, for use in polling the content source. In the alternative or in parallel, the requests from the given mobile application/client on the mobile device (e.g., mobile device 250) can temporarily be sent across the network to the content source for direct responses to be provided to the mobile device and/or until a modification of an identifier which works can be generated.

In one embodiment, responses are stored as server cache elements in the server cache when new or changed data is detected for a response that is already stored on a local cache (e.g., cache 285) of the mobile device (e.g., mobile device 250). Therefore, the mobile device or local proxy 275 can connect to the proxy server 325 to retrieve the new or changed data for a response to a request which was previously cached locally in the local cache 285 (now invalid, out-dated, or otherwise determined to be irrelevant).

The proxy server 325 can detect new or changed data at a monitored content source 310 and transmits a message to the mobile device notifying it of such a change such that the mobile device (or the local proxy on the mobile device) can take appropriate action (e.g., to invalidate the cache elements in the local cache. In some instances, the proxy server (e.g., the caching policy manager 355) upon detecting new or changed data, can also store the new or changed data in its cache (e.g., the server cache 135 or 335 of the examples of FIG. 1B and FIG. 3A, respectively). The updated/new data stored in the server cache can in some instances, be used to satisfy content requests at the mobile device, for example, after the proxy server has notified the mobile device of the new/changed content and that the locally cached content has been invalidated.

Figure 4A:
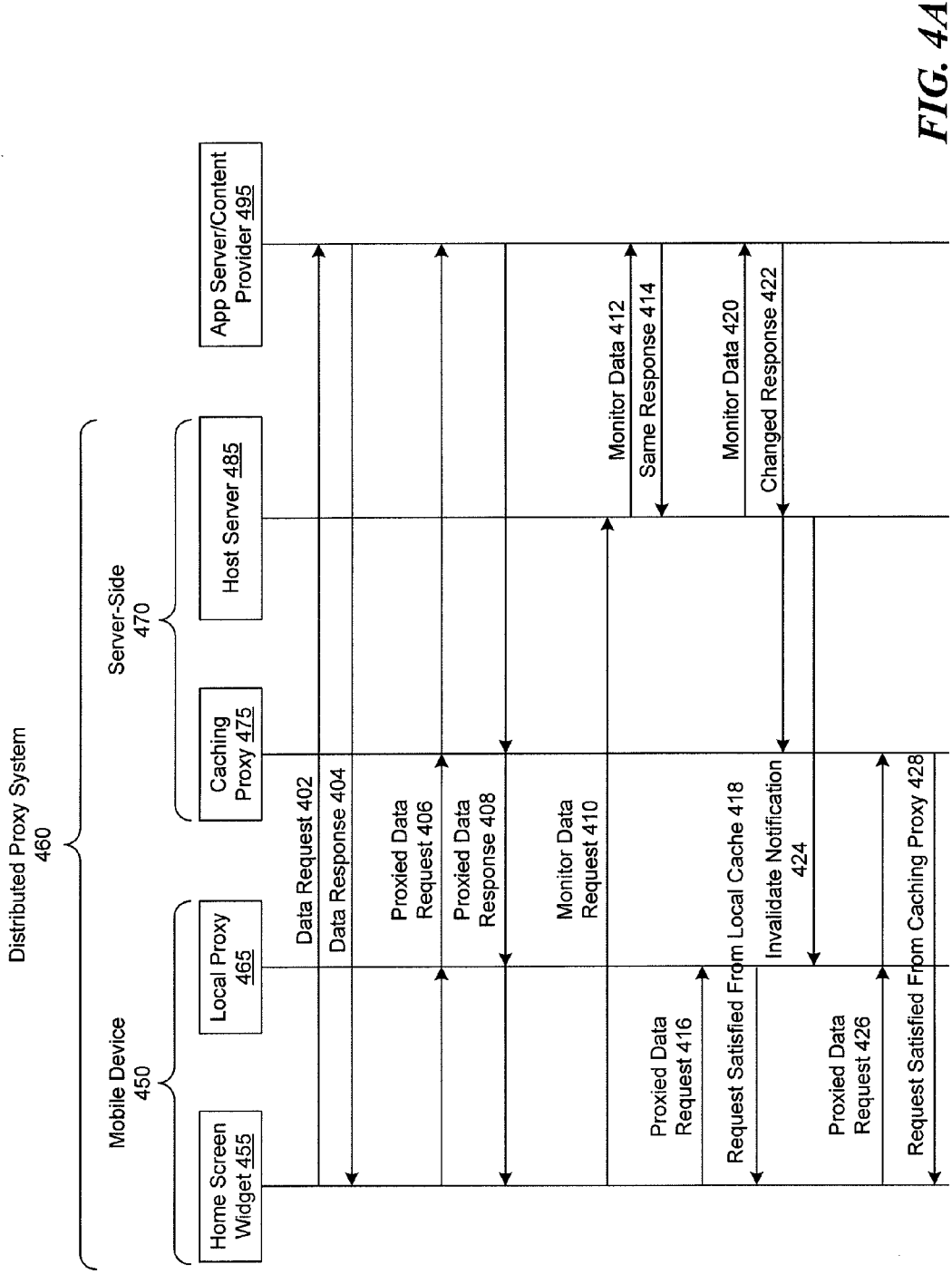
FIG. 4A depicts a timing diagram showing how data requests from a mobile devicemobile device (e.g., any wireless device) to an application server/content provider in a wireless network (or broadband network) can be coordinated by a distributed proxy system in a manner such that network and battery resources are conserved through using content caching and monitoring performed by the distributed proxy system.

FIG. 4A depicts a diagram showing how data requests from a mobile device 450 to an application server/content provider 495 in a wireless network can be coordinated by a distributed proxy system 460 in a manner such that network and battery resources are conserved through using content caching and monitoring performed by the distributed proxy system 460.

In satisfying application or client requests on a mobile device 450 without the distributed proxy system 460, the mobile device 450, or the software widget executing on the device 450 performs a data request 402 (e.g., an HTTP GET, POST, or other request) directly to the application server 495 and receives a response 404 directly from the server/provider 495. If the data has been updated, the widget on the mobile device 450 can refreshes itself to reflect the update and waits for small period of time and initiates another data request to the server/provider 495.

In one embodiment, the requesting client or software widget 455 on the device 450 can utilize the distributed proxy system 460 in handling the data request made to server/provider 495. In general, the distributed proxy system 460 can include a local proxy 465 (which is typically considered a client-side component of the system 460 and can reside on the mobile device 450), a caching proxy 475 (considered a server-side component 470 of the system 460 and can reside on the host server 485 or be wholly or partially external to the host server 485), a host server 485. The local proxy 465 can be connected to the caching proxy 475 and host server 485 via any network or combination of networks.

When the distributed proxy system 460 is used for data/application requests, the widget 455 can perform the data request 406 via the local proxy 465. The local proxy 465, can intercept the requests made by device applications, and can identify the connection type of the request (e.g., an HTTP get request or other types of requests). The local proxy 465 can then query the local cache for any previous information about the request (e.g., to determine whether a locally stored response is available and/or still valid). If a locally stored response is not available or if there is an invalid response stored, the local proxy 465 can update or store information about the request, the time it was made, and any additional data, in the local cache. The information can be updated for use in potentially satisfying subsequent requests.

The local proxy 465 can then send the request to the host server 485 and the host server 485 can perform the request 406 and returns the results in response 408. The local proxy 465 can store the result and in addition, information about the result and returns the result to the requesting widget 455.

In one embodiment, if the same request has occurred multiple times (within a certain time period) and it has often yielded same results, the local proxy 465 can notify 410 the server 485 that the request should be monitored (e.g., steps 412 and 414) for result changes prior to returning a result to the local proxy 465 or requesting widget 455.

In one embodiment, if a request is marked for monitoring, the local proxy 465 can now store the results into the local cache. Now, when the data request 416, for which a locally response is available, is made by the widget 455 and intercepted at the local proxy 465, the local proxy 465 can return the response 418 from the local cache without needing to establish a connection communication over the wireless network.

In addition, the server proxy performs the requests marked for monitoring 420 to determine whether the response 422 for the given request has changed. In general, the host server 485 can perform this monitoring independently of the widget 455 or local proxy 465 operations. Whenever an unexpected response 422 is received for a request, the server 485 can notify the local proxy 465 that the response has changed (e.g., the invalidate notification in step 424) and that the locally stored response on the client should be erased or replaced with a new response.

In this case, a subsequent data request 426 by the widget 455 from the device 450 results in the data being returned from host server 485 (e.g., via the caching proxy 475) and in step 428, the request is satisfied from the caching proxy 475. Thus, through utilizing the distributed proxy system 460 the wireless (cellular) network is intelligently used when the content/data for the widget or software application 455 on the mobile device 450 has actually changed. As such, the traffic needed to check for the changes to application data is not performed over the wireless (cellular) network. This reduces the amount of generated network traffic and shortens the total time and the number of times the radio module is powered up on the mobile device 450, thus reducing battery consumption, and in addition, frees up network bandwidth.

FIG. 4B depicts an interaction diagram showing how application polls for content from an application server/content provider which employs cache-defeating mechanisms in content identifiers (e.g., identifiers intended to defeat cache) in a wireless network can still be detected and locally cached.

In one example, when the mobile application/widget 455 polls an application server/provider in step 432, the poll can locally be intercepted in step 434 on the mobile device by local proxy 465. In step 434, the local proxy 465 on the mobile device may also determine (with some level of certainty and heuristics) that a cache defeating mechanism is employed or may be employed by the server provider.

The local proxy 465 can detect that the cached content is available for the polled content in the request and can thus retrieve a response from the local cache to satisfy the intercepted poll 436, without requiring use of wireless network bandwidth or other wireless network resources. The mobile application/widget 455 can subsequently receive a response to the poll from a cache entry in step 438 (e.g., a locally stored cache entry on the mobile device).

In another example, the application widget 455 (e.g., mobile application widget) polls the application server/provider 495 in step 440. The poll is intercepted in step 442 by the local proxy 465 which determines that a cache defeat mechanism is employed by the server/provider 495. The local proxy 465 also detects that cached content is unavailable in the local cache for this request and decides to setup the polled content source for caching in step 444. The local proxy 465 can then extract a pattern (e.g., a format or syntax) of an identifier of the request and track the polling frequency of the application to setup a polling schedule of the host server 485 in step 446.

To satisfy the request, the poll request is forwarded to the content source 495 in step 448. The application server/provider 495 receives the poll request from the application and provides a response to satisfy the current request in step 450. In step 452, the mobile application/widget 455 receives the response from the application server/provider 495 to satisfy the request.

In conjunction, in order to setup content caching, the local proxy 465 caches the response and stores a normalized version of the identifier (or a hash value of the normalized identifier) in association with the received response for future identification and retrieval in step 454. The local proxy sends the cache setup to the host server 485 in step 456, the cache setup including, for example, the identifier and/or a normalized version of the identifier. In some instances, a modified identifier, different from the normalized identifier is sent to the host server 485.

The host server 485 can use the cache setup which includes, for example, an identification of the application server/provider to be polled and optionally a polling schedule in step 458. The host server 485 can now poll the application server/provider 495 to monitor responses to the request in step 460, on behalf of the mobile device. The application server 495 receives the poll from the host server 485 responds in step 462. The host server 485 determines that the same response has been received and polls the application server 495, for example, according to the specified polling schedule and using the normalized or modified identifier, in step 464. The application server/content provider 495 receives the poll and responds accordingly in step 466.

This time, the host server 485 detects changed or new responses, and notifies the local proxy 465 in step 468. The host server 485 can additionally store the changed or new response in the server cache 435 or caching proxy 475 in step 470. The local proxy 465 receives notification from the host server 485 that new or changed data is now available and can invalidate the affected cache entries in step 472. The next time the mobile application/widget generates the same request for the same server/content provider 495 in step 474, the local proxy 465 determines that no valid cache entry is available and instead retrieves a response from the server cache in step 476, for example, through an HTTP connection. The host server 485 receives the request for the new response and sends the response back to the local proxy 465 in step 478. The request is thus satisfied from the server cache or caching proxy in step 480 without the need for the mobile device to utilize its radio or to consume mobile network bandwidth thus conserving network resources.

Alternatively, when the application (e.g., mobile application) 455 generates the same request, the local proxy 465, in response to determining that no valid cache entry is available in step 484, forwards the poll to the application server provider 495 in step 482 over the mobile network. The application server/provider 495 receives the poll and sends the response back to the mobile device in step 486 over the mobile network. The request is thus satisfied from the server/provider using the mobile network 486 in step 488.

Figure 5:
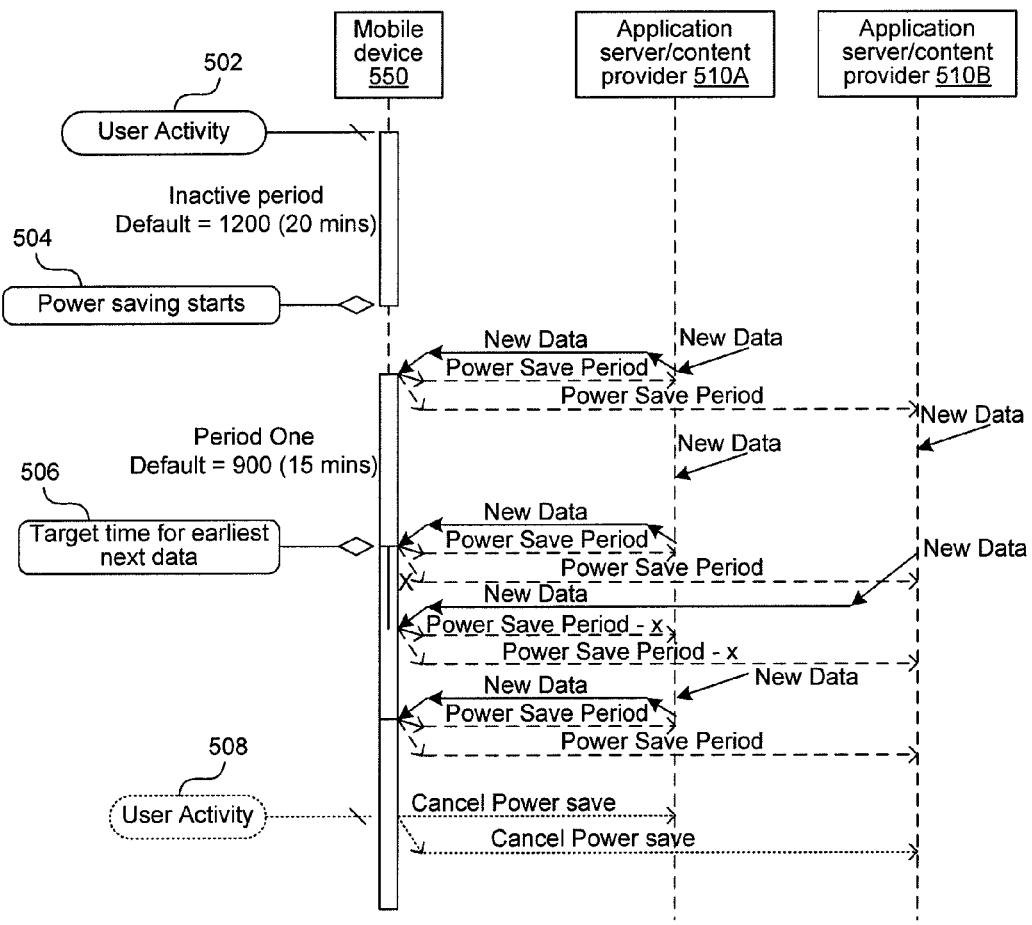
FIG. 5 depicts a diagram showing one example process for implementing a hybrid IP and SMS power saving mode on a mobile device (e.g., any wireless device) using a distributed proxy and cache system (e.g., such as the distributed system shown in the example of FIG. 1B).

FIG. 5 depicts a diagram showing one example process for implementing a hybrid IP and SMS power saving mode on a mobile device 550 using a distributed proxy and cache system (e.g., such as the distributed system shown in the example of FIG. 1B).

In step 502, the local proxy (e.g., proxy 175 in the example of FIG. 1B) monitors the device for user activity. When the user is determined to be active, server push is active. For example, always-on-push IP connection can be maintained and if available, SMS triggers can be immediately sent to the mobile device 550 as it becomes available.

In process 504, after the user has been detected to be inactive or idle over a period of time (e.g., the example is shown for a period of inactivity of 20 min.), the local proxy can adjust the device to go into the power saving mode. In the power saving mode, when the local proxy receives a message or a correspondence from a remote proxy (e.g., the server proxy 135 in the example of FIG. 1B) on the server-side of the distributed proxy and cache system, the local proxy can respond with a call indicating that the device 550 is currently in power save mode (e.g., via a power save remote procedure call). In some instances, the local proxy can take the opportunity to notify multiple accounts or providers (e.g., 510A, and 510B) of the current power save status (e.g., timed to use the same radio power-on event).

In one embodiment, the response from the local proxy can include a time (e.g., the power save period) indicating to the remote proxy (e.g., server proxy 135) and/or the application server/providers 510A/B when the device 550 is next able to receive changes or additional data. A default power savings period can be set by the local proxy.

In one embodiment, if new, changed, or different data or event is received before the end of any one power saving period, then the wait period communicated to the servers 510A/B can be the existing period, rather than an incremented time period. In response, the remote proxy server, upon receipt of power save notification from the device 550, can stop sending changes (data or SMS's) for the period of time requested (the wait period). At the end of the wait period, any notifications received can be acted upon and changes sent to the device 550, for example, as a single batched event or as individual events. If no notifications come in, then push can be resumed with the data or an SMS being sent to the device 550. The proxy server can time the poll or data collect event to optimize batch sending content to the mobile device 550 to increase the chance that the client will receive data at the next radio power on event.

Note that the wait period can be updated in operation in real time to accommodate operating conditions. For example, the local proxy can adjust the wait period on the fly to accommodate the different delays that occur in the system.

Detection of user activity in step 508 at the device 550 causes the power save mode to be exited. When the device 550 exits power save mode, it can begin to receive any changes associated with any pending notifications. If a power saving period has expired, then no power save cancel call may be needed as the proxy server will already be in traditional push operation mode.

In one embodiment, power save mode is not applied when the device 550 is plugged into a charger. This setting can be reconfigured or adjusted by the user or another party. In general, the power save mode can be turned on and off, for example, by the user via a user interface on device 550. In general, timing of power events to receive data can be synchronized with any power save calls to optimize radio use.

Figure 6:
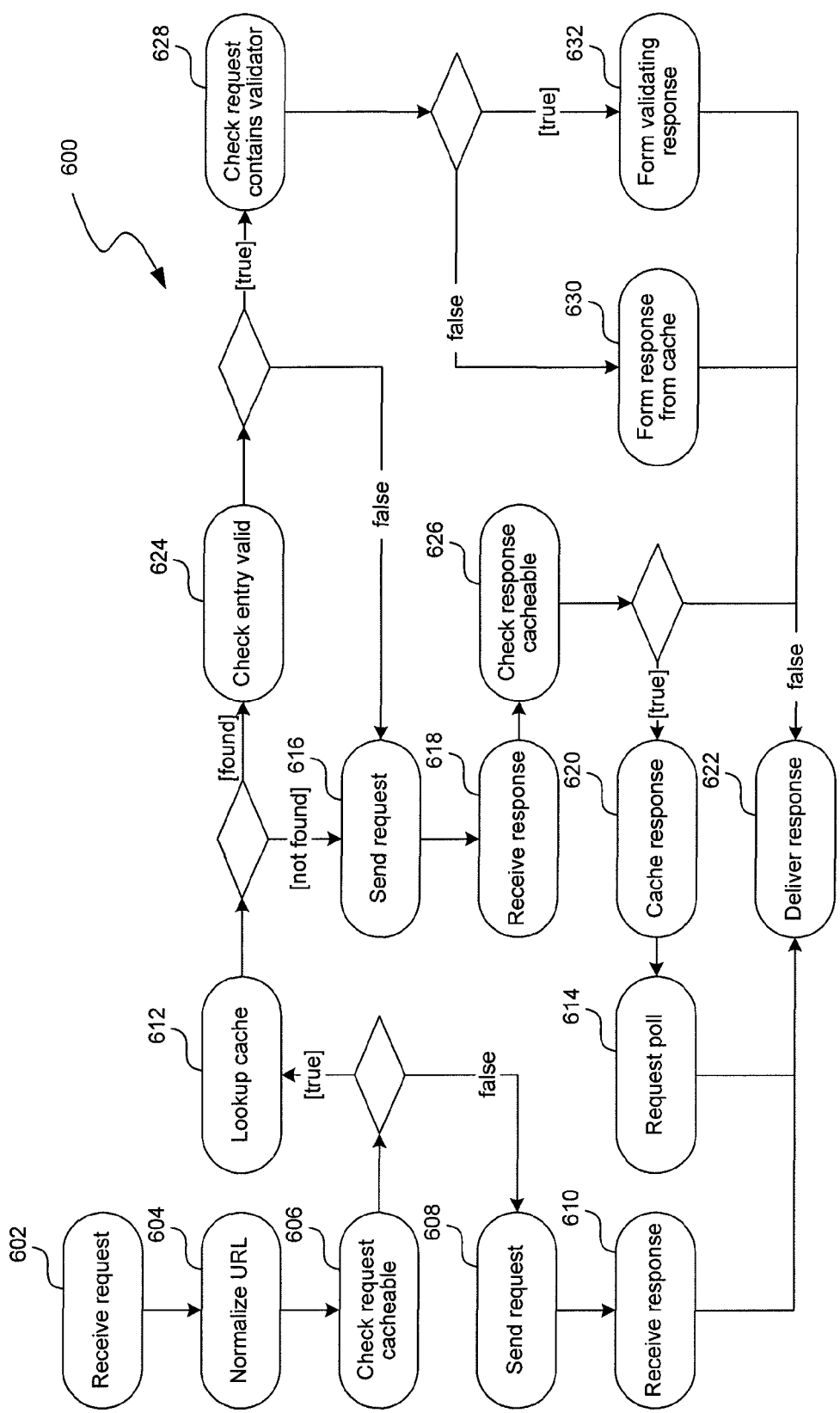
FIG. 6 depicts a flow diagram illustrating an example process for distributed content caching between a mobile device (e.g., any wireless device) and remote proxy and the distributed management of content caching.

FIG. 6 depicts another flow diagram 600 illustrating an example process for distributed content caching between a mobile device and a proxy server and the distributed management of content caching.

As shown in the distributed system interaction diagram in the example of FIG. 4A, the disclosed technology is a distributed caching model with various aspects of caching tasks split between the client-side/mobile device side (e.g., mobile device 450 in the example of FIG. 4A) and the server side (e.g., server side 470 including the host server 485 and/or the optional caching proxy 475).

In general the device-side responsibilities can include, deciding whether a response to a particular request can be and/or should be cached. The device-side of the proxy can make this decision based on information (e.g., timing characteristics, detected pattern, detected pattern with heuristics, indication of predictability or repeatability) collected from/during both request and response, and cache it (e.g., storing it in a local cache on the mobile device). The device side can also notify the server-side in the distributed cache system of the local cache event and notify it monitor the content source (e.g., application server/content provider 110 of FIG. 1A-B).

The device side can further instruct the server side of the distributed proxy to periodically validate the cache response (e.g., by way of polling, or sending polling requests to the content source). The device side can further decide whether a response to a particular cache request should be returned from the local cache (e.g., whether a cache hit is detected). The decision can be made by the device side (e.g., the local proxy on the device) using information collected from/during request and/or responses received from the content source.

In general, the server-side responsibilities can include, validating cached responses for relevancy (e.g., determine whether a cached response is still valid or relevant to its associated request). The server-side can send the mobile device an invalidation request to notify the device side when a cached response is detected to be no longer valid or no longer relevant (e.g., the server invalidates a given content source). The device side then can remove the response from the local cache.

The diagram of FIG. 6 illustrates caching logic processes performed for each detected or intercepted request (e.g., HTTP request) detected at a mobile device (e.g., client-side of the distributed proxy). In step 602, the client-side of the proxy (e.g., local proxy 275 shown in FIG. 2A-B or mobile device 450 of FIG. 4A) receives a request (from an application (e.g., mobile application) or mobile client). In step 604, URL is normalized and in step the client-side checks to determine if the request is cacheable, in step 606. If the request is determined to be not cacheable in step 612, the request is sent to the source (application server/content provider) in step 608 and the response is received 610 and delivered to the requesting application 622, similar to a request-response sequence without interception by the client side proxy.

If the request is determined to be cacheable, in step 612, the client-side looks up the cache to determine whether a cache entry exists for the current request. If so, in step 624, the client-side can determine whether the entry is valid and if so, the client side can check the request to see if includes a validator (e.g., a modified header or an entity tag) in step 628. For example, the concept of validation is eluded to in section 13.3 of RFC 2616 which describes in possible types of headers. and forms a validating response 632 if so to be delivered to the requesting application in step 622. If the request does not include a validator as determined by step 628, a response is formed from the local cache in step 630 and delivered to the requesting application in step 622. This validation step can be used for content that would otherwise normally be considered un-cacheable.

If, instead, in step 624, the cache entry is found but determined to be no longer valid or invalid, the client side of the proxy, sends the request to the content source (application server/content host) and receives a response directly from the source in step 618. Similarly, if in step 612, a cache entry was not found during the look up, the request is also sent in step 616. Once the response is received, the client side checks the response to determine if it is cacheable in step 626. If so, the response is cached in step 620. The client then sends another poll in step 614 and then delivers the response to the requesting application in step 622.

FIG. 7A-B depicts example request-response pairs showing cacheable responses 704 and 754 addressed by identifiers with changing parameters 702 and 752.

The request/response pairs shown in the examples of FIG. 7A illustrate timing parameters 702 used for cache defeat, for example, since the responses 704 received for each request is the same, even though the timing parameters 702 change each time. The resource identifier and the parameter 702 can be identified as cache defeating upon the second time the 'response' is detected to be the same, or the third time, or a later subsequent time. The caching of the 'response=x' can similarly begin the second detected same response, the third detected same response, or a later subsequent detected same response.

Similarly, the request response pairs shown in the examples of FIG. 7B illustrate random parameters 752 that are used for cache defeat, since the responses 754 received for each request is the same, even though the random parameters 752 in the identifiers are varying each time. The resource identifier and the parameter 702 can be identified as cache defeating upon the second time the 'response' is detected to be the same, or the third time, or a later subsequent time. The caching of the 'response=x' can similarly begin the second detected same response, the third detected same response, or a later subsequent detected same response.

Although two types of changing parameters are shown (timing/date 702 and random parameter 752) other types of changing parameters may be used for cache defeat and can be similarly detected by the system.

Figure 8:
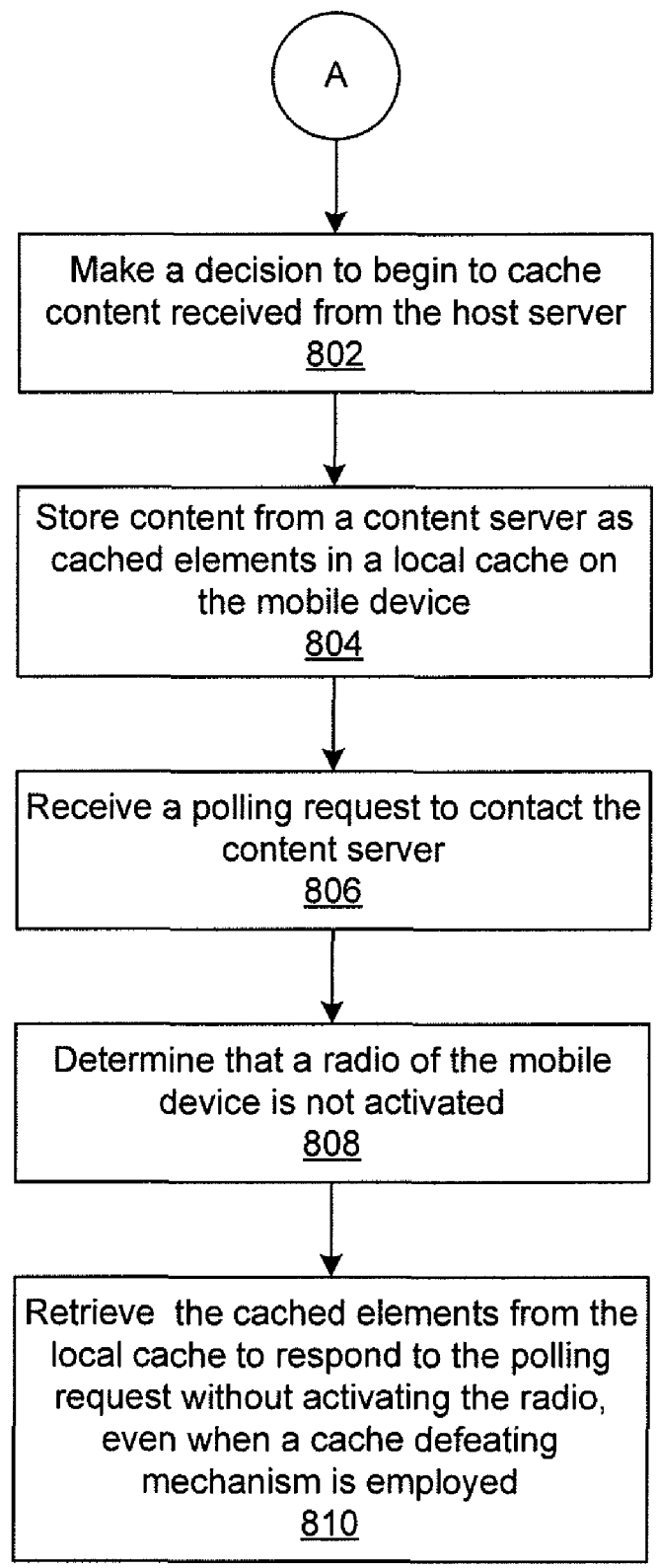
FIG. 8 depicts a flow chart illustrating an example process for using local cache to respond to a polling request even when a cache defeating mechanism is employed in the identifier used to address content by the polling request.

FIG. 8 depicts a flow chart illustrating an example process for using local cache to respond to a polling request even when a cache defeating mechanism is employed in the identifier used to address content by the polling request.

Figure 9:
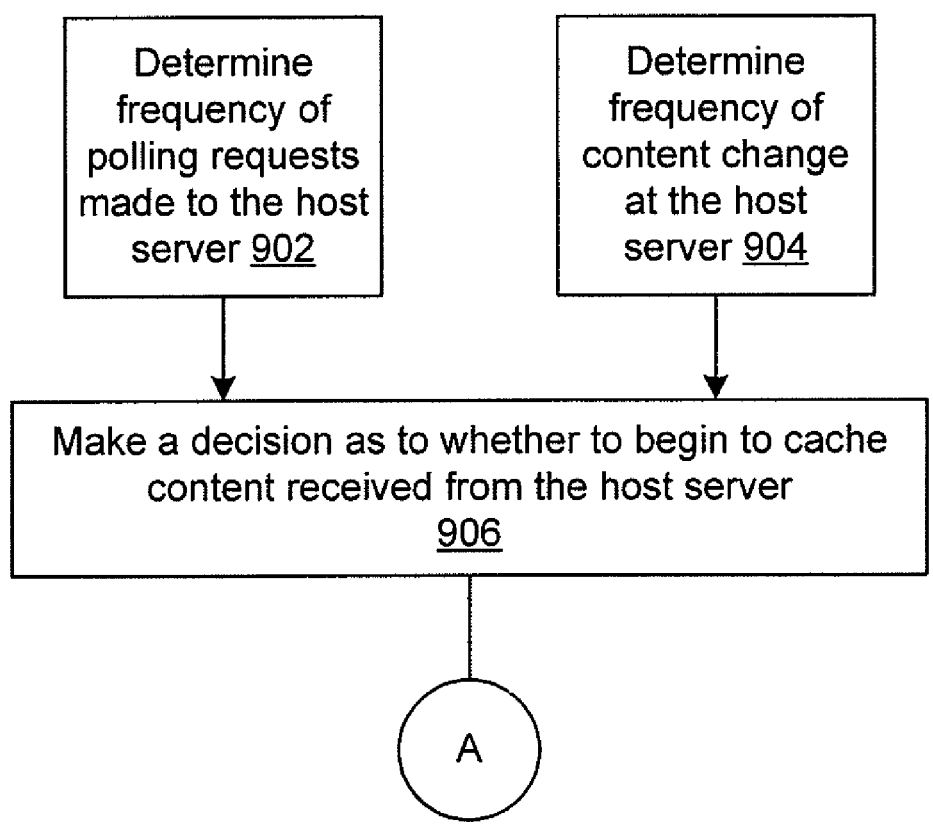
FIG. 9 depicts a flow chart illustrating example processes for determining whether to cache content from a particular host server (content source).

In process 802, a decision is made to begin to cache content received from the host server. The decision can be made through the example processes shown in the example of FIG. 9 which depicts a flow chart illustrating example processes for determining whether to cache content from a particular host server (content source), by determining the frequency of polling requests made to the host server in step 902 and/or by determining the frequency of content change at the host server, in step 904. The two steps can be used in conjunction or independently of one another in deciding whether content from the host server is to be cached, in step 906.

In process 804, content from a content server is stored as cached elements in a local cache on the mobile device. In process 806, a polling request to contact the content server is received, for example, by the distributed caching system. In process 808, it is determined that a radio of the mobile device is not activated and in process 810, the cached elements are retrieved from the local cache to respond to the polling request without activating the radio, even when a cache defeating mechanism is employed.

The cache defeat mechanism, or identifiers used intended to defeat cache addressed by such identifiers, can be employed by the content server (the server to which the polling requests using the identifiers are directed). In general, the cache defeating mechanism or identifiers intended for cache defeat can be detected from a syntax or pattern of a resource identifier included in the polling request identifying the content server.

For example, the resource identifier can include a URI or URL and the URI/URL is normalized by performing one or more of the following steps: converting the URI scheme and host to lower-case, capitalizing letters in percent-encoded escape sequences, removing a default port, or removing duplicate slashes. In addition, the identifier normalization process, for an identifier employing cache defeat, removes any portion of the identifier which is intended to defeat cache (e.g., typically a changing parameter between requests detectable by the format, pattern, or syntax of the parameter).

Note that the detection of cache defeat mechanisms or identifiers intended to defeat cache need not be determined with 100% certainty. Identifiers with certain characteristics (e.g., having parameters matching specific formats) can in addition to be determined to be employing cache defeat, may simply be treated as cache defeating or intended for defeating cache, for the purposes of caching content over a wireless network, and managed in a distributed fashion, for example.

Figure 10:
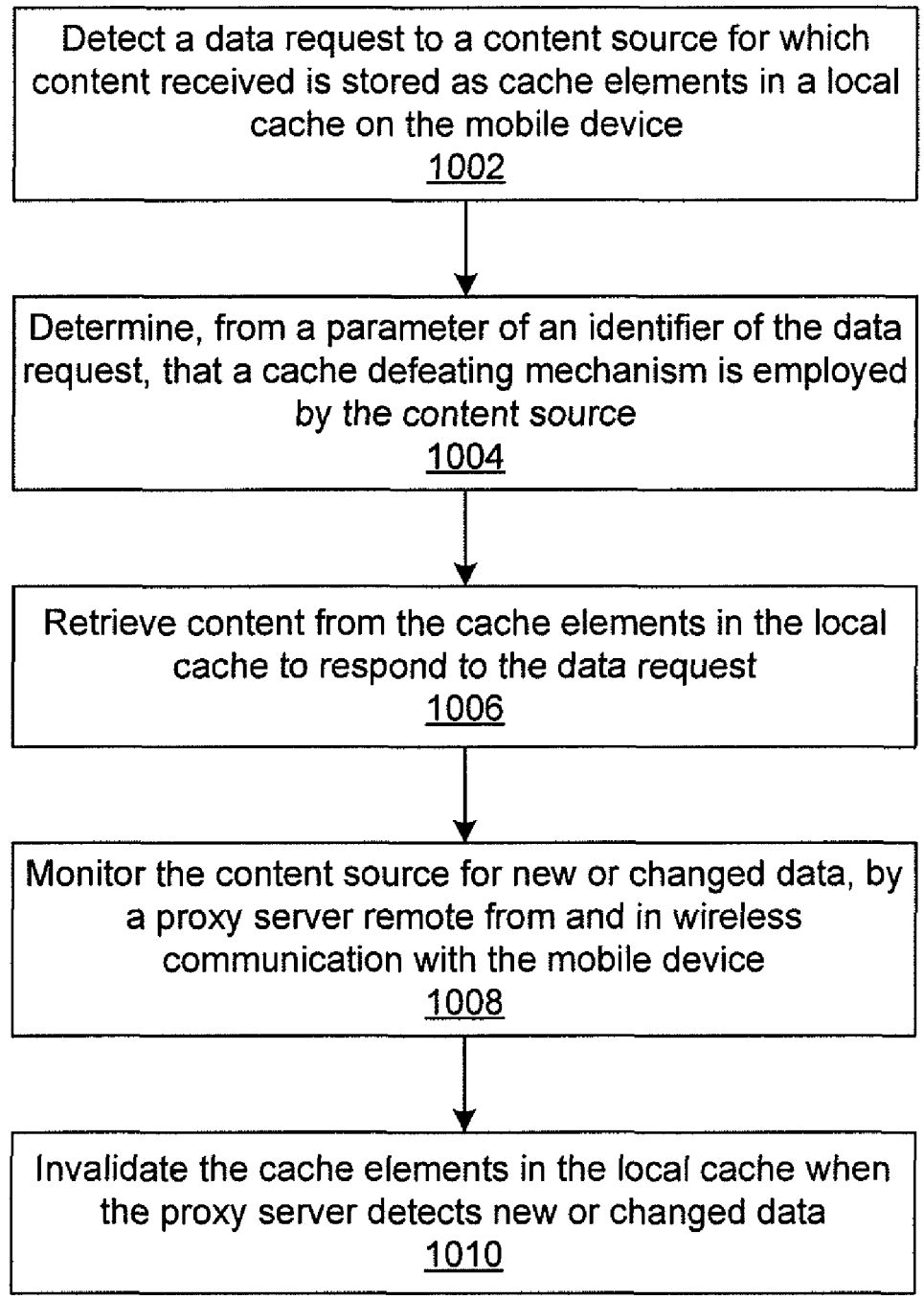
FIG. 10 depicts a flow chart illustrating an example process for detecting cache defeat using a changing parameter in an identifier of a data request and using cached responses to server the data request.

FIG. 10 depicts a flow chart illustrating an example process for using detecting cache defeat using a changing parameter in an identifier of a data request to detect cache defeating mechanisms employed by a content source and using cached responses to server the data request.

In process 1002, a data request to a content source for which content received is stored as cache elements in a local cache on the mobile device is detected. In process 1004, it is determined, from an identifier of the data request, that a cache defeating mechanism is employed by the content source.

In one embodiment, a parameter in the identifier indicates that the caching defeat mechanism is used. For example, a format, syntax, and/or pattern of the parameter can be used to detect that the cache defeat mechanism is used. In one embodiment, the parameter indicating the cache defeat mechanism includes one or more changing parameters and that a changing parameter in the identifier is identified to indicate cache defeat when responses corresponding to multiple data requests are the same even when the multiple data requests used identifiers with the changing parameter being different for each of the multiple data requests.

For example, when two or more responses for the data requests with changing parameters are detected in responses, the parameter can be identified or indicated as intended for defeating cache or potentially defeating cache. Alternatively, three or more same responses may be needed to identify a given changing parameter in an identifier as intended to defeat cache or potentially defeating cache. The number of same responses required for identifying a given parameter as cache defeating or a given content source as employing cache defeat mechanisms can be static or dynamically adjusted. The number of same responses may also be different for different resource identifiers, different types of changing parameters (e.g., date/time parameter, randomly changing parameter, or other types of parameters), different formats of changing parameters, or different resources.

In addition, the identifier can be normalized and the cache elements can be stored in the local cache as being associated with a normalized version of the identifier. Such an association allows the identifier for a given request to be normalized to identify content from the cache elements stored in the local cache to respond to future data requests.

In process 1006, content is retrieved from the cache elements in the local cache to respond to the data request. For example, in the case that a changing parameter is used or intended for use as cache defeat in an address or identifier, a normalized version of the identifier which excludes the changing parameter can be generated and used to identify associated content that is retrieved from the cache elements to response to the data request.

When a data request that is received employs a content identifier (e.g., URL or URI) with a changing parameter determined to be or is likely used for cache defeat, the changing parameter can first be removed from a query used the query the local cache to determine whether a stored response is available for the given data request. For example, cached responses can be queried using identifier hashes and the changing parameter can be removed before computing the hash for cache retrieval.

In process 1008, the content source (e.g., application server/content provider 110 of FIGS. 1A-B and 310 of FIG. 3B) is monitored for new or changed data, for example, by a proxy server (e.g., proxy 125 or 325 in the examples of FIG. 1B and FIG. 3A respectively) which is remote from and in wireless communication with the mobile device. In one embodiment, the proxy server uses a modified identifier to poll the content source In process 1010, the cache elements are invalidated in the local cache or removed from the local cache (e.g., by local proxy 175 FIG. 1B or 275 of FIG. 2A) when the proxy server detects new or changed data. The proxy server can monitor the content source for new or changed data at a frequency that is based on a polling frequency of the content source from the mobile device, for example.

Figure 11:
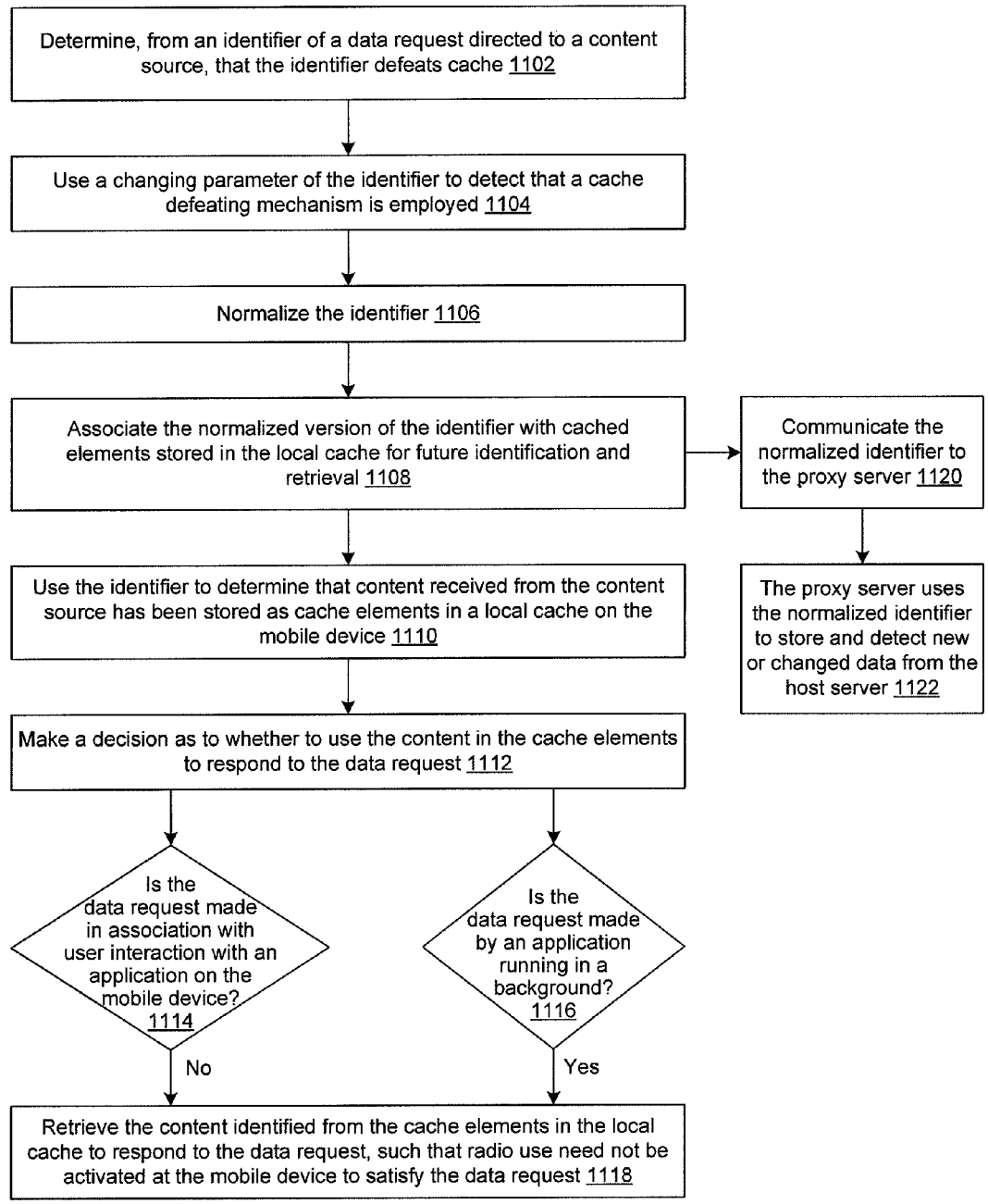
FIG. 11 depicts a flow chart illustrating an example process for caching content from sources employing cache-defeating mechanisms in the identifiers using the pattern, syntax, or format of identifiers associated with the sources.

FIG. 11 depicts a flow chart illustrating an example process for facilitating content caching of content from sources employing cache-defeating mechanisms in the identifiers using the pattern, syntax, or format of identifiers associated with the sources.

In process 1150, it is determined, from an identifier of a data request directed to a content source, that the identifier defeats cache. In process 1104, a changing parameter of the identifier is used to detect that a cache defeating mechanism is employed. In process 1106, the identifier is normalized. In process 1108, the normalized version of the identifier is associated with cached elements stored in the local cache for future identification and retrieval. In process 1110, the identifier is used to determine that content received from the content source has been stored as cache elements in a local cache on the mobile device.

In process 1112, a decision is made as to whether to use the content in the cache elements to respond to the data request. The decision can be made based on one or more criteria. For example, in process 1114, it can be determined whether the data request made in association with user interaction with an application on the mobile device. If not, in process 1118, the content identified is retrieved from the cache elements in the local cache to respond to the data request, such that radio use need not be or is not activated at the mobile device to satisfy the data request.

In another example, in process 1116, it can be determined whether the data request is made by an application running in a background. If so, in process 1118, the content identified is retrieved from the cache elements in the local cache to respond to the data request, such that radio use need not be or is not activated at the mobile device to satisfy the data request.

In process 1120, the normalized identifier is communicated to the proxy server. In process 1122, the proxy server can use the normalized identifier to store and detect new or changed data from the host server.

Figure 12:
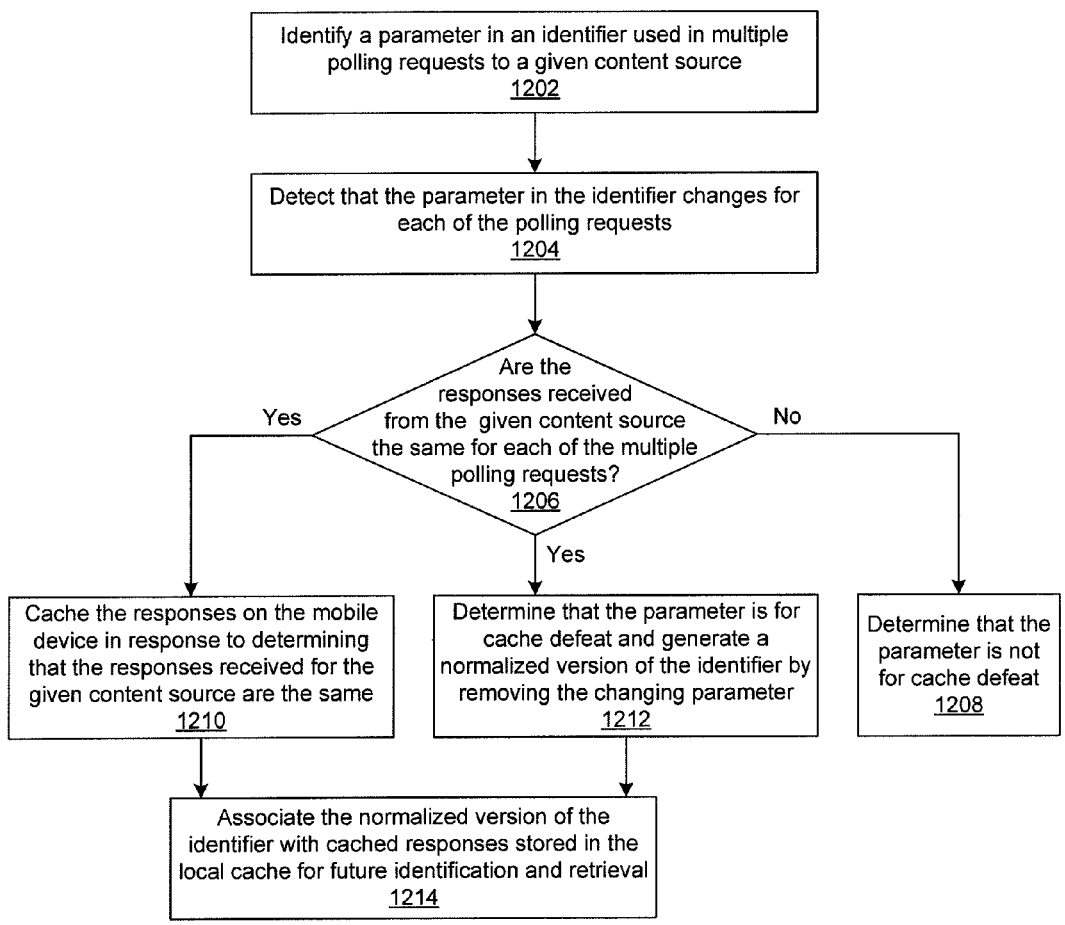
FIG. 12 depicts a flow chart illustrating an example process for determining whether a parameter in an identifier defeats caching of the addressed content and determining cacheability of the addressed content.

FIG. 12 depicts a flow chart illustrating an example process for determining whether a parameter in an identifier defeats caching of the addressed content and determining cacheability of the addressed content.

In process 1202, a parameter in an identifier used in multiple polling requests to a given content source is identified. In process 1204, it is detected that the parameter in the identifier changes for each of the polling requests. In one embodiment, the format, or pattern, or syntax of the parameter is further used to determine that the parameter indicates cache defeat. For example, the format of the parameter can be used to determine that the parameter is or may be a date and/or time parameter. In some instances, multiple changing parameters in the identifier may be identified. For example, the identifier can include a changing time parameter and a changing date parameter, as shown in the example of parameters 702 in the example of FIG. 7A.

The parameter can be ascertained or further verified to be a date or time parameter by a comparison with current date and/or time (e.g., system time, UNIX time, etc.). If the comparison of the date/time indicated by possible date/time parameter in the identifier with the current date/time indicates a match or a match within a certain tolerance level (e.g., +/−5%, 10%, 15%, 20%, etc.), the parameter in question can be determined to be a date/time parameter and/or determined to be treated as a date/time parameter for the purposes of caching the addressed content and management thereof.

The changing parameter, or one or more of the changing parameters in a given identifier, may be a random parameter that changes randomly with no detectable pattern of variation or readily identifiable/detectable meaning, as illustrated as parameters 752 in the example of FIG. 7B. In general, a random parameter can be determined to be varying randomly or treated as being varying randomly for the purposes of cacheability or cache defeat analysis/handling procedures when a parameter has no apparent or detectable impact or correlation on a response sent by the host for the request, over a period of time and/or over a number of responses.

In process 1206, it is determined whether the responses received from the given content source are the same for each of the multiple polling requests. If not, in process 1208, it is determined that the parameter is not or may not be used for cache defeat. In response, the identifier may be categorized as or treated as one not using cache defeat, or one that cannot be handled, at least at the present moment as one employing cache defeat mechanism. The addressed content, as such, may not be cached, at least for the present request, and/or for subsequent same/similar requests, and/or different requests addressed to the same host. The request itself and/or the host (e.g., application server/content source) to which the identifier used in the request is addressed can one or both be identified as non-cacheable, for example.

When the request is identified as being non-cacheable, the request can be sent over the network (e.g., cellular or wireless network) to the host for the request to be satisfied, since the local device cache likely does not have a cached response for the request. Once a request and/or a given host is identified or determined to be treated as non-cacheable, the categorization and handling process (no-caching) can be applied over a period of time, a set number of requests or applied indefinitely. For example, the identifier or identifiers for other requests sent to the same host can be re-evaluated periodically (e.g., via process 1202-1206) to assess cacheability (e.g., whether addressed content is cacheable and/or cacheable when cache defeat mechanisms are processed and appropriately treated).

Otherwise, in process 1210, the responses are cached in response to determining that the responses received for the given content source are the same. Further, in process 1212, it is determined that the parameter is used for cache defeat and normalized version of the identifier can be generated by removing the changing parameter.

In process 1214, the normalized version of the identifier is associated with cached responses in the local cache for future identification and retrieval. In one embodiment, the normalized version of the identifier without the parameter is communicated to the proxy server, for use by the proxy server in storing and detecting new or changed data from the host server. For example, the modified identifier can be used in polling the given content source to detect new or changed data from the content source for the polling requests, by the proxy server remote from the mobile device. The modified identifier can include, for example, a substitute parameter in place of the parameter that is used to defeat cache. For example, say a URL has a timestamp in it: http://someurl.com/next?x=1&y=<number of seconds since epoc> The modified URL can be: http://someurl.com/next?x=1&y=##time##, where the 'y' parameter is now substituted.

Figure 13:
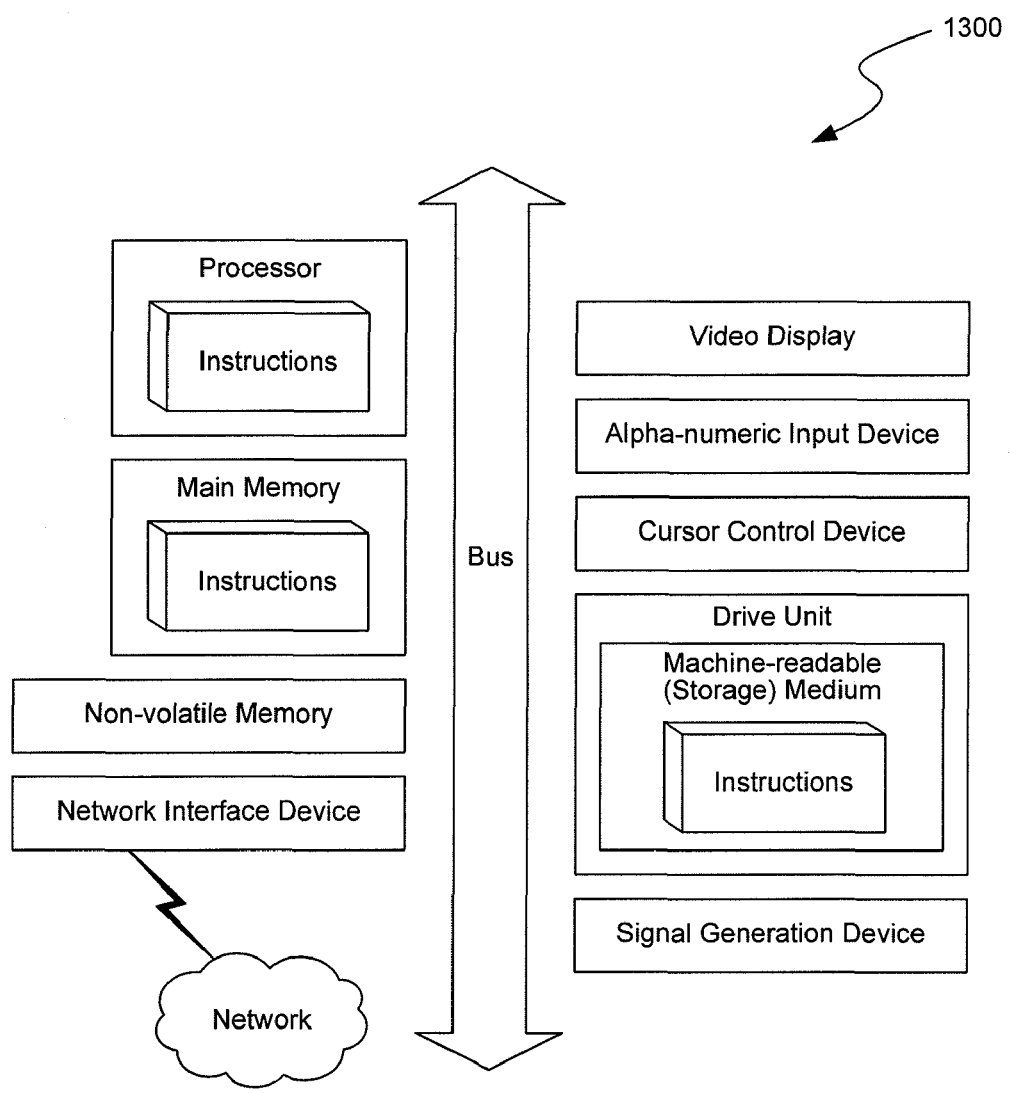
FIG. 13 shows a diagrammatic representation of a machine in the example form of a computer system within which a set of instructions, for causing the machine to perform any one or more of the methodologies discussed herein, may be executed.

FIG. 13 shows a diagrammatic representation of a machine 1300 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of resource management in a wireless network by caching content on a mobile device, the method, comprising:
   detecting a data request to a content source for which content received is stored as cache elements in a local cache on the mobile device;
   determining, from an identifier of the data request, that a cache defeating mechanism is used by the content source;
   retrieving content from the cache elements in the local cache to respond to the data request;
   wherein, a changing parameter in the identifier is identified to indicate cache defeat when responses corresponding to multiple data requests are the same even when the multiple data requests used identifiers with the changing parameter being different for each of the multiple data requests.

2. The method of claim 1, wherein, a parameter in the identifier indicates that the caching defeat mechanism is used.

3. The method of claim 2, wherein, a format of the parameter is used to detect that the cache defeat mechanism is used.

4. The method of claim 2, wherein, the parameter indicating the cache defeat mechanism includes one or more changing parameters.

5. The method of claim 1, wherein, the responses corresponding to the multiple data requests includes at least two responses that that are the same to identify the changing parameter as indicating cache defeat.

6. The method of claim 1, wherein, the responses corresponding to the multiple data requests includes at least three responses that that are the same to identify the changing parameter as indicating cache defeat.

7. The method of claim 1, wherein, the content retrieved from the cache elements for the data request is identified in the local cache using a normalized version of the identifier which excludes the changing parameter.

8. The method of claim 2, wherein, the parameter includes a time and/or date parameter.

9. The method of claim 4, wherein, the one or more changing parameters include a changing time parameter and a changing date parameter.

10. The method of claim 2, wherein, the parameter includes a random parameter.

11. The method of claim 1, further comprising, normalizing the identifier to identify content from the cache elements stored in the local cache to respond to the data request; wherein, the cache elements are stored in the local cache as being associated with a normalized version of the identifier.

12. The method of claim 1, further comprising,
   monitoring the content source for new or changed data, by a proxy server remote from and in wireless communication with the mobile device, using a modified version of the identifier;
   wherein, the proxy server monitors the content source for new or changed data at a frequency that is based on polling frequency of the content source from the mobile device.

13. The method of claim 12, further comprising, removing the cache elements from the local cache when the proxy server detects new or changed data.

14. A method of resource management in a network by caching content on a mobile device, the method, comprising:
   storing content from a content server as cached elements in a local cache on the mobile device;
   in response to receiving a polling request to contact the content server, retrieving the cached elements from the local cache to respond to the polling request made at the mobile device such that a radio of the mobile device need not be activated to service the polling request, even when a cache defeating mechanism is employed;
   detecting the cache defeating mechanism from a syntax or pattern of a resource identifier included in the polling request identifying the content server.

15. The method of claim 14, wherein, the cache defeating mechanism is employed by the content server.

16. The method of claim 14, wherein, the resource identifier includes a URI and the URI is normalized by converting the URI scheme and host to lower-case.

17. The method of claim 14, wherein, the identifier includes a URI and the URI is normalized by, performing one or more of, capitalizing letters in percent-encoded escape sequences, removing a default port, and removing duplicate slashes.

18. A method of resource management in a wireless network by caching content on a mobile device, the method, comprising:

determining, from an identifier of a data request directed to a content source, that the identifier defeats cache;

wherein, a changing parameter in the identifier is used to detect that a cache defeating mechanism is employed;

generating a normalized version of the identifier by removing the changing parameter; and using the normalized version identifier to determine that content received from the content source has been stored as cache elements in a local cache on the mobile device;

making a decision as to whether to use the content in the cache elements to respond to the data request;

retrieving the content identified from the cache elements in the local cache to respond to the data request, such that radio use need not be or is not activated at the mobile device to satisfy the data request.

19. The method of claim 18, wherein, in making the decision, the content identified in the cache elements is not used to respond to the data request, when the data request is made in association with user interaction with an application on the mobile device.

20. The method of claim 18, wherein, in making the decision, the content identified in the cache elements is used to respond to the data request, when the data request is made by an application running in a background.

21. A machine-readable storage medium having stored thereon instructions which when executed by a processor causes the processor to perform a method of resource management in a network by detecting cache defeat for caching content on a mobile device, the method, comprising:

identifying a parameter in an identifier used in multiple polling requests to a given content source;

wherein, a format of the parameter is used to determine that the parameter is a date or time parameter;

detecting that the parameter in the identifier changes for each of the polling requests;

determining whether responses received from the given content source are the same for each of the multiple polling requests;

caching the responses on the mobile device in response to determining that the responses received for the given content source are the same.

22. The method of claim 21, wherein, a format of the parameter is used to determine that the parameter indicates cache defeat.

23. The method of claim 21, further comprising, determining that the parameter is a date or time parameter by a comparison with current date and/or time.

24. The method of claim 21, further comprising, generating a normalized version of the identifier by removing the parameter; wherein, the normalized version of the identifier is associated with cached elements in the local cache for future identification and retrieval.

25. The method of claim 24 wherein, the normalized version of the identifier without the parameter is communicated to the proxy server, for use by the proxy server in storing and detecting new or changed data from the host server.

26. The method of claim 25, wherein, a modified identifier is used in polling the given content source to detect new or changed data from the content source for the polling requests, wherein, by the content source is polled by a proxy server remote from mobile device, wherein, the modified identifier uses a substitute parameter in place of the parameter that is used to defeat cache.

27. A method of resource management in a wireless network by caching content on a mobile device, the method, comprising:

detecting a data request to a content source for which content received is stored as cache elements in a local cache on the mobile device;

determining, from an identifier of the data request, that a cache defeating mechanism is used by the content source;

retrieving content from the cache elements in the local cache to respond to the data request;

normalizing the identifier to identify content from the cache elements stored in the local cache to respond to the data request; wherein, the cache elements are stored in the local cache as being associated with a normalized version of the identifier.

28. A method of resource management in a wireless network by caching content on a mobile device, the method, comprising:

detecting a data request to a content source for which content received is stored as cache elements in a local cache on the mobile device;

determining, from an identifier of the data request, that a cache defeating mechanism is used by the content source;

retrieving content from the cache elements in the local cache to respond to the data request;

monitoring the content source for new or changed data, by a proxy server remote from and in wireless communication with the mobile device, using a modified version of the identifier;

wherein, the proxy server monitors the content source for new or changed data at a frequency that is based on polling frequency of the content source from the mobile device.

29. The method of claim 28, further comprising, removing the cache elements from the local cache when the proxy server detects new or changed data.

30. A machine-readable storage medium having stored thereon instructions which when executed by a processor causes the processor to perform a method of resource management in a network by detecting cache defeat for caching content on a mobile device, the method, comprising:

identifying a parameter in an identifier used in multiple polling requests to a given content source;

detecting that the parameter in the identifier changes for each of the polling requests;

determining whether responses received from the given content source are the same for each of the multiple polling requests;

caching the responses on the mobile device in response to determining that the responses received for the given content source are the same;

generating a normalized version of the identifier by removing the parameter;

wherein, the normalized version of the identifier is associated with cached elements in the local cache for future identification and retrieval.

31. The method of claim 24 wherein, the normalized version of the identifier without the parameter is communicated to the proxy server, for use by the proxy server in storing and detecting new or changed data from the host server.

32. The method of claim 25, wherein, a modified identifier is used in polling the given content source to detect new or changed data from the content source for the polling requests, wherein, by the content source is polled by a proxy server remote from mobile device, wherein, the modified identifier uses a substitute parameter in place of the parameter that is used to defeat cache.

33. A method of resource management in a wireless network by caching content on a mobile device, the method, comprising:
- determining, from an identifier of a data request directed to a content source, that the identifier defeats cache;
- wherein, a changing parameter in the identifier is used to detect that a cache defeating mechanism is employed;
- generating a normalized version of the identifier by removing the changing parameter; and
- using the normalized version identifier to determine that content received from the content source has been stored as cache elements in a local cache on the mobile device;
- making a decision as to whether to use the content in the cache elements to respond to the data request;
- wherein, in making the decision, the content identified in the cache elements is not used to respond to the data request, when the data request is made in association with user interaction with an application on the mobile device.

34. A method of resource management in a wireless network by caching content on a mobile device, the method, comprising:
- determining, from an identifier of a data request directed to a content source, that the identifier defeats cache;
- wherein, a changing parameter in the identifier is used to detect that a cache defeating mechanism is employed;
- generating a normalized version of the identifier by removing the changing parameter; and
- using the normalized version identifier to determine that content received from the content source has been stored as cache elements in a local cache on the mobile device;
- making a decision as to whether to use the content in the cache elements to respond to the data request;
- wherein, in making the decision, the content identified in the cache elements is used to respond to the data request, when the data request is made by an application running in a background.

* * * * *

UNITED STATES PATENT AND TRADEMARK OFFICE
CERTIFICATE OF CORRECTION

Page 1 of 1

PATENT NO. : 8,190,701 B2
APPLICATION NO. : 13/287072
DATED : May 29, 2012
INVENTOR(S) : Michael Luna et al.

It is certified that error appears in the above-identified patent and that said Letters Patent is hereby corrected as shown below:

In column 1, line 43, delete "INA" and insert -- IN A --, therefor.

In column 1, line 54, delete "AND" and insert -- FOR --, therefor.

In column 2, line 10, delete "reference" and insert -- reference. --, therefor.

In column 46, line 8, in claim 5, before "are" delete "that".

In column 46, line 12, in claim 6, before "are" delete "that".

In column 46, line 30, in claim 12, delete "comprising," and insert -- comprising: --, therefor.

In column 48, line 56, in claim 31, delete "24" and insert -- 30 --, therefor.

In column 48, line 60, in claim 32, delete "25," and insert -- 31, --, therefor.

Signed and Sealed this
Twenty-third Day of October, 2012

David J. Kappos
*Director of the United States Patent and Trademark Office*